US012693165B2

(12) United States Patent
Hogo et al.

(10) Patent No.: US 12,693,165 B2
(45) Date of Patent: Jul. 28, 2026

(54) SENSOR UNIT DRIVE DEVICE, AND DISPLAY DEVICE

(71) Applicant: EIZO Corporation, Hakusan (JP)

(72) Inventors: Hidekazu Hogo, Hakusan (JP); Fumihiko Motomura, Hakusan (JP)

(73) Assignee: EIZO Corporation, Hakusan (JP)

( * ) Notice: Subject to any disclaimer, the term of this patent is extended or adjusted under 35 U.S.C. 154(b) by 90 days.

(21) Appl. No.: 18/724,195

(22) PCT Filed: Dec. 19, 2022

(86) PCT No.: PCT/JP2022/046596
§ 371 (c)(1),
(2) Date: Jun. 26, 2024

(87) PCT Pub. No.: WO2023/139996
PCT Pub. Date: Jul. 27, 2023

(65) Prior Publication Data
US 2025/0224276 A1 Jul. 10, 2025

(30) Foreign Application Priority Data

Jan. 21, 2022 (JP) .................................. 2022-008104

(51) Int. Cl.
*G01J 3/50* (2006.01)
*G01J 1/42* (2006.01)

(52) U.S. Cl.
CPC ................. *G01J 3/506* (2013.01); *G01J 1/42* (2013.01)

(58) Field of Classification Search
CPC ...... G09G 2320/0693; G09G 2360/145; G01J 3/506; G01J 1/0403; G01J 1/42; G06F 1/1601
See application file for complete search history.

(56) References Cited

U.S. PATENT DOCUMENTS

| | | | |
|---|---|---|---|
| 2008/0204437 A1* | 8/2008 | Jensen | G01J 1/32 345/207 |
| 2014/0091210 A1 | 4/2014 | Hogo et al. | |

(Continued)

FOREIGN PATENT DOCUMENTS

| CN | 105023512 A | 11/2015 |
|---|---|---|
| CN | 106384563 A | 2/2017 |

(Continued)

OTHER PUBLICATIONS

CN-110753464-A (Year: 2020).*

(Continued)

*Primary Examiner* — Sanjiv D. Patel
(74) *Attorney, Agent, or Firm* — Maier & Maier, PLLC

(57) ABSTRACT

A sensor unit drive device, including: a sensor unit having a sensor; and a drive mechanism connected to the sensor unit and driving the sensor unit. The sensor measures optical characteristics of a display panel that includes a display surface that displays an image, the sensor unit is provided on a side surface of the display panel in a retracted position, and is configured such that the sensor faces the display surface in a detection position, the sensor unit moves so that the retracted position and the detection position can be switched when the drive mechanism drives the sensor unit, and the sensor unit moves to the detection position by a rotational movement of rotating around a rotational axis non-perpendicular to the display surface from the retracted position and a bending movement of bending toward the display surface via a hinge structure, when the drive mechanism drives the sensor unit.

13 Claims, 20 Drawing Sheets

(56)     References Cited

U.S. PATENT DOCUMENTS

| | | | |
|---|---|---|---|
| 2014/0192077 A1 | 7/2014 | Gomi et al. | |
| 2015/0206482 A1 | 7/2015 | Ito et al. | |
| 2017/0025054 A1 | 1/2017 | Su et al. | |
| 2017/0047024 A1* | 2/2017 | Hogo .................... | G06F 1/1601 |
| 2018/0120163 A1 | 5/2018 | Su et al. | |
| 2019/0251929 A1 | 8/2019 | Fossati et al. | |
| 2019/0394455 A1 | 12/2019 | Hogo et al. | |
| 2020/0196458 A1 | 6/2020 | Wu et al. | |
| 2021/0088377 A1 | 3/2021 | Juan et al. | |

FOREIGN PATENT DOCUMENTS

| | | | | |
|---|---|---|---|---|
| CN | 109521592 A | 3/2019 | | |
| CN | 109686254 A | 4/2019 | | |
| CN | 110751899 A | 2/2020 | | |
| CN | 110753464 A * | 2/2020 | .......... | H05K 5/0217 |
| JP | 2012-150136 A | 8/2012 | | |
| JP | 2012-150213 A | 8/2012 | | |
| JP | 2013-003273 A | 1/2013 | | |
| JP | 5202654 B2 | 6/2013 | | |
| JP | 2014-132304 A | 7/2014 | | |
| JP | 2015-203794 A | 11/2015 | | |
| JP | 2019-535031 A | 12/2019 | | |
| KR | 10-2015-0095055 A | 8/2015 | | |
| WO | 2013102997 A1 | 7/2013 | | |
| WO | 2018/116339 A1 | 6/2018 | | |

OTHER PUBLICATIONS

International Search Report issued on Jan. 31, 2023 in corresponding application No. PCT/JP2022/046596; 6 pgs.
Office Action issued on May 26, 2026, in corresponding Chinese Application No. 202280086383.1, 15 pages.

* cited by examiner

UP

LEFT

BACK

FRONT

RIGHT

DOWN

2

UP

FRONT    LEFT

RIGHT    BACK

DOWN

BACK

LEFT ←——→ RIGHT

FRONT

SENSOR UNIT DRIVE DEVICE, AND DISPLAY DEVICE

TECHNICAL FIELD

The present invention relates to a sensor unit drive device, and a display device.

BACKGROUND

As an image display device that displays images, a product that has a function of measuring optical characteristics such as brightness of a display surface and performing calibration based on the measurement results is proposed. Patent Literature 1 discloses a sensor unit operating mechanism that can move a sensor unit having an optical sensor between a storage position in a bezel surrounding a display surface and a measurement position on the display surface.

PATENT LITERATURE

[Patent Literature 1] The publication of Japanese Patent No. 5202654

SUMMARY

In the sensor unit operating mechanism of Patent Literature 1, the sensor unit is rotated between a storage position and a measurement position in front of the display surface. In such a configuration, in order to provide space for storing the sensor unit within the bezel, there are constraints in the design of the bezel that at least in the portion where the space is formed, the bezel must protrude in front of the display surface by more than the thickness of the sensor unit, and the width of the bezel must be more than the width of the sensor unit. In particular, when using a relatively large sensor unit that can measure positions close to the center of the display surface, there was a problem in that the protrusion amount and width of the bezel are large and the appearance of the image display device is impaired.

The present invention has been made in view of such a circumstance. An object of the present invention is to provide a sensor unit drive device that does not project a bezel in front of a display surface, and allows a sensor unit to be able to be stored while making the bezel width smaller, and enables the sensor unit to be moved smoothly from a stored state to measure the display surface.

The present invention provides a sensor unit drive device, comprising: a sensor unit having a sensor; and a drive means connected to the sensor unit and driving the sensor unit, wherein the sensor is configured to measure optical characteristics of a display panel that includes a display surface that displays an image, the sensor unit is configured to be provided on a side surface of the display panel in a retracted position, and is configured such that the sensor faces the display surface in a detection position, the sensor unit moves so that the retracted position and the detection position can be switched when the drive means drives the sensor unit, and the sensor unit is configured to move to the detection position by a rotational movement of rotating around a rotational axis non-perpendicular to the display surface from the retracted position and a bending movement of bending toward the display surface via a hinge structure, when the drive means drives the sensor unit.

In the sensor unit drive device according to the present invention, the sensor unit is configured to be provided on a side surface of the display panel in a retracted position, and is configured such that the sensor faces the display surface in a detection position. The sensor unit at the retracted position is moved to the detection position by the rotational movement and the bending movement. With this configuration, without making the bezel protrude forward, in addition, while reducing the width of the bezel, even relatively large sensor unit, especially that can reach a position closer to a center of a monitor, can be stored in the retracted position, additionally, the sensor unit can be smoothly moved to the detection position.

Various embodiments of the present invention are described below. Any of the embodiments described below can be combined with one another.

Preferably, a bezel is provided on a periphery of the side surface of the display panel, and the sensor unit is configured to perform the bending movement after protruding from the bezel by the rotational movement.

Preferably, the drive means is provided on the side surface side of the display panel, or across the side surface side and a back side of the display panel.

Preferably, the sensor unit is configured to start the bending movement in a middle of the rotational movement.

Preferably, the hinge structure is provided on a base end side of the sensor unit, and the sensor is provided on a tip side of the sensor unit.

Preferably, the sensor unit drive device includes a slide component, the slide component is connected to the hinge structure and provided on a base end side of the sensor unit, and the sensor is provided on a tip side of the sensor unit.

Preferably, the slide component includes a first member connected to the hinge structure and a second member connected to the first member, and the first member is configured to be rotatable relative to the second member.

Preferably, the slide component includes a rotational movement pin at an end opposite to a side connected to the hinge structure.

Preferably, the sensor unit drive device includes a bending movement pin, and the bending movement pin is provided on the base end side of the sensor unit so that both ends thereof respectively protrude from a pair of opposing side surfaces of the sensor unit.

Preferably, the drive means includes a first cam, a second cam, and an actuator, the first cam includes a first groove and a second groove formed continuously with the first groove, the second cam includes a third groove, the rotational movement of the sensor unit is performed by the rotational movement pin moving along the first groove, and the bending movement of the sensor unit is performed by the bending movement pin moving along the third groove at the same time as the rotational movement pin moves along the second groove.

Preferably, the hinge structure includes a first slope provided on the drive means side and a second slope provided on the sensor unit side, and the bending movement of the sensor unit is performed by the first slope and the second slope sliding against each other.

Preferably, the sensor unit is configured to be expandable and contractible in a longitudinal direction.

Preferably, the present invention provides a display device, comprising: the sensor unit drive device; and the display panel.

BRIEF DESCRIPTION OF DRAWINGS

FIG. 1 is a perspective view of a display device 1 including a sensor unit drive device 2 according to a first embodiment.

FIG. 12 is a schematic diagram for explaining a movement of a slide component 7 and a bending movement pin 33 during the bending movement of the sensor unit 3 according to the first embodiment.

FIG. 15 is a schematic diagram of an operation mode of the sensor unit drive device 2 according to the second embodiment when viewed from above.

FIG. 16 is a structural diagram showing a state where the sensor unit drive device 2 according to the third embodiment is in a retracted position.

FIG. 17 is a structural diagram where the sensor unit drive device 2 according to the third embodiment is performing the rotational movement.

FIG. 18 is a schematic diagram showing a movement of the sensor unit drive device 2 according to the fourth embodiment.

FIG. 19 is a schematic diagram showing the movement of the sensor unit drive device 2 according to the fifth embodiment.

FIG. 20 is a schematic diagram showing the movement of the sensor unit drive device 2 according to a modification of the fifth embodiment.

DETAILED DESCRIPTION

Now, embodiments of the present invention will be described with reference to the drawings. Various features described in the embodiments below can be combined with each other. In addition, the present invention is established independently for each feature.

1. First Embodiment

1.1. Basic Form

Figure 1A:
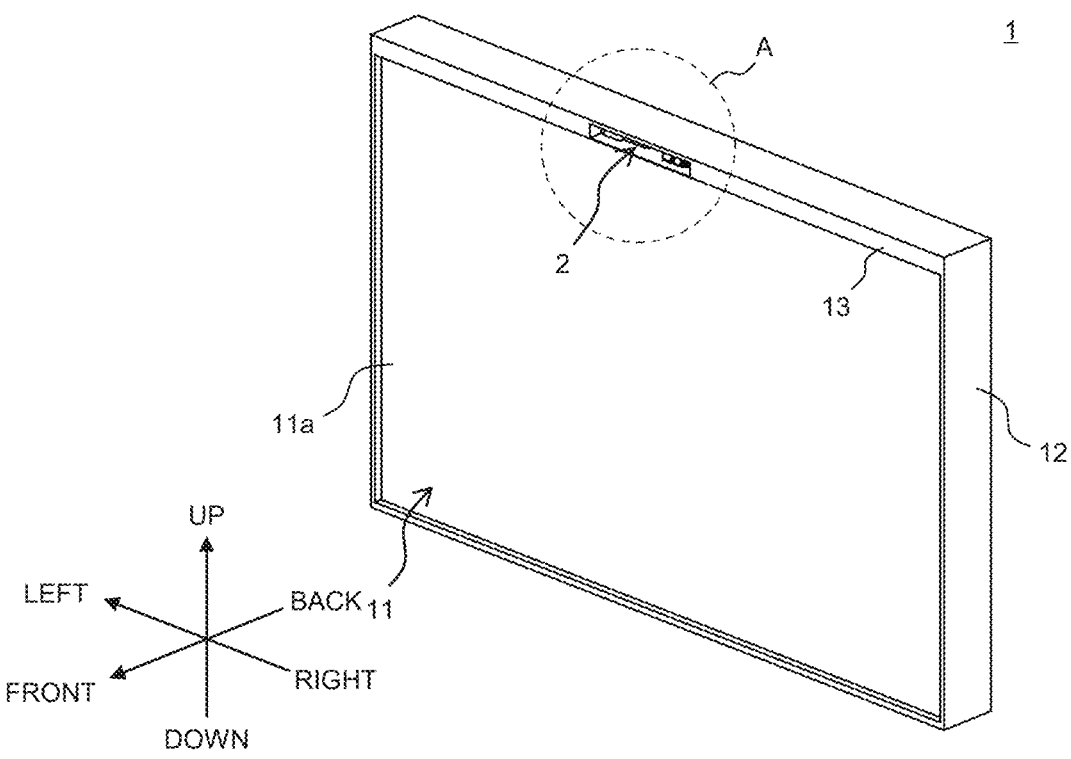
FIG. 1A is a diagram showing a state where a sensor unit 3 is in a retracted position.
Figure 1B:
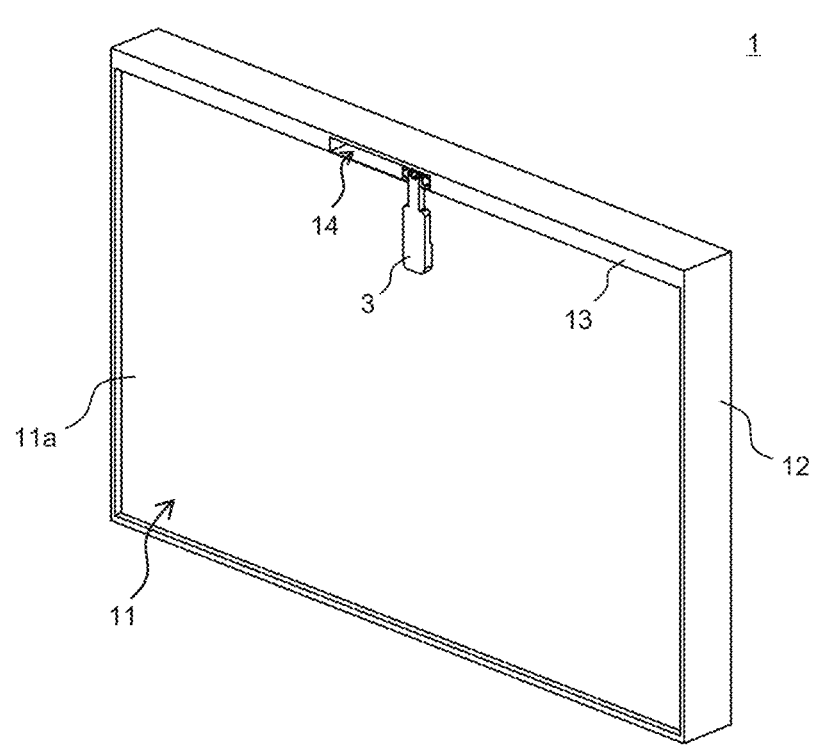
FIG. 1B is a diagram showing a state where the sensor unit 3 is in a detection position.
Figure 2:
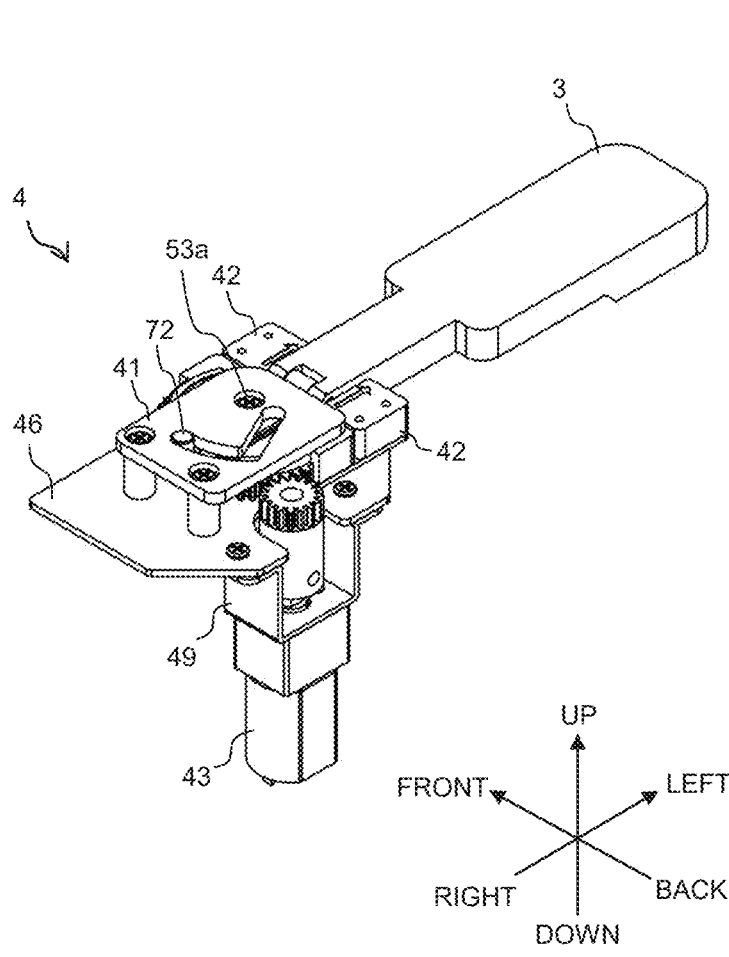
FIG. 2 is a perspective view of the sensor unit drive device 2 viewed from above and from a back side of the display panel 11 with the sensor unit 3 in the retracted position.
Figure 3:
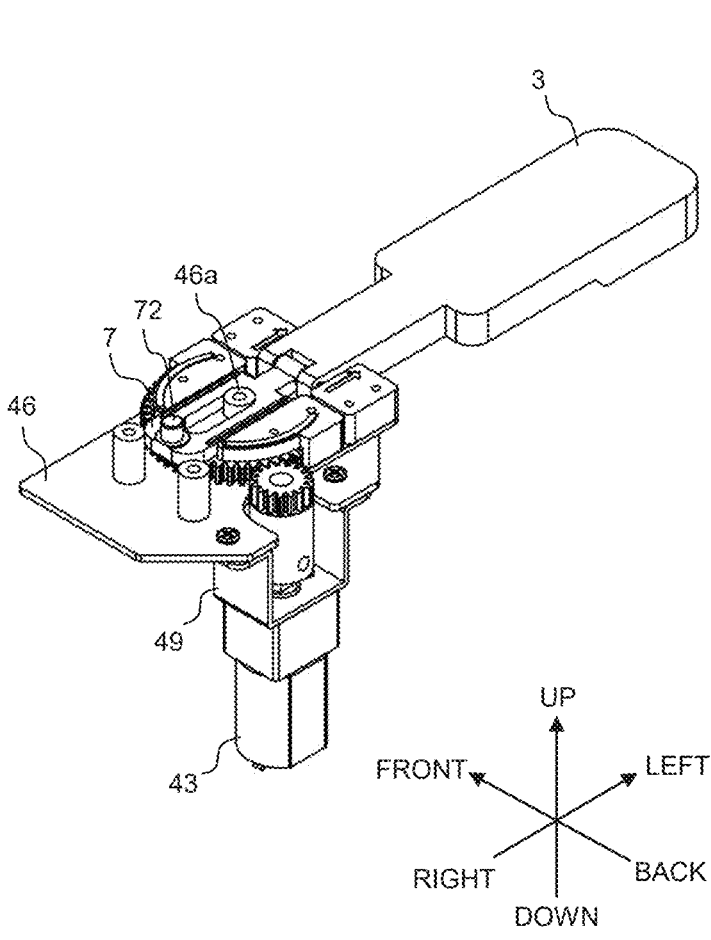
FIG. 3 is a perspective view of the sensor unit drive device 2 of FIG. 2 with a first cam 41 removed.
Figure 4:
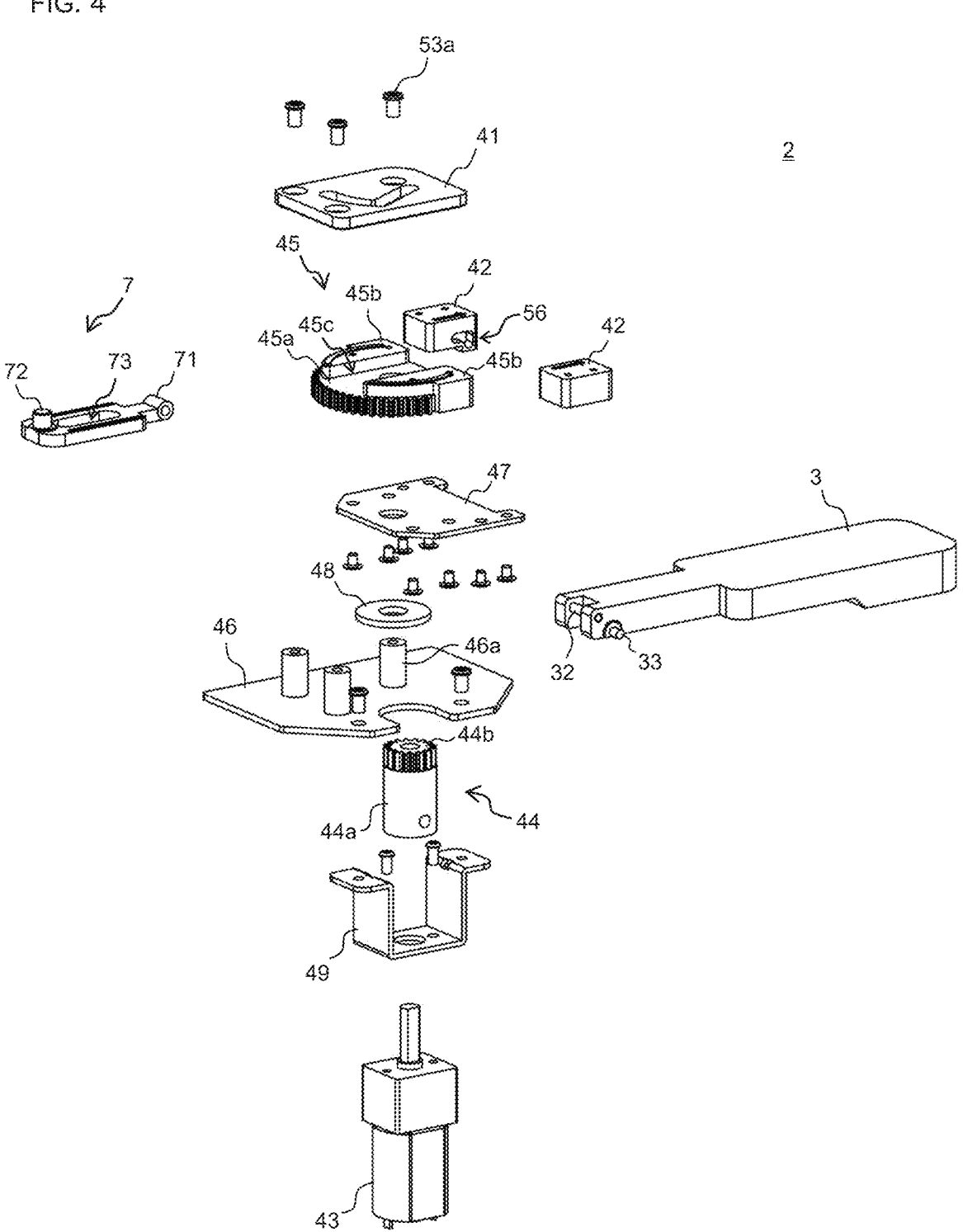
FIG. 4 is an exploded perspective view from above of the sensor unit drive device 2 according to the first embodiment.
Figure 5:
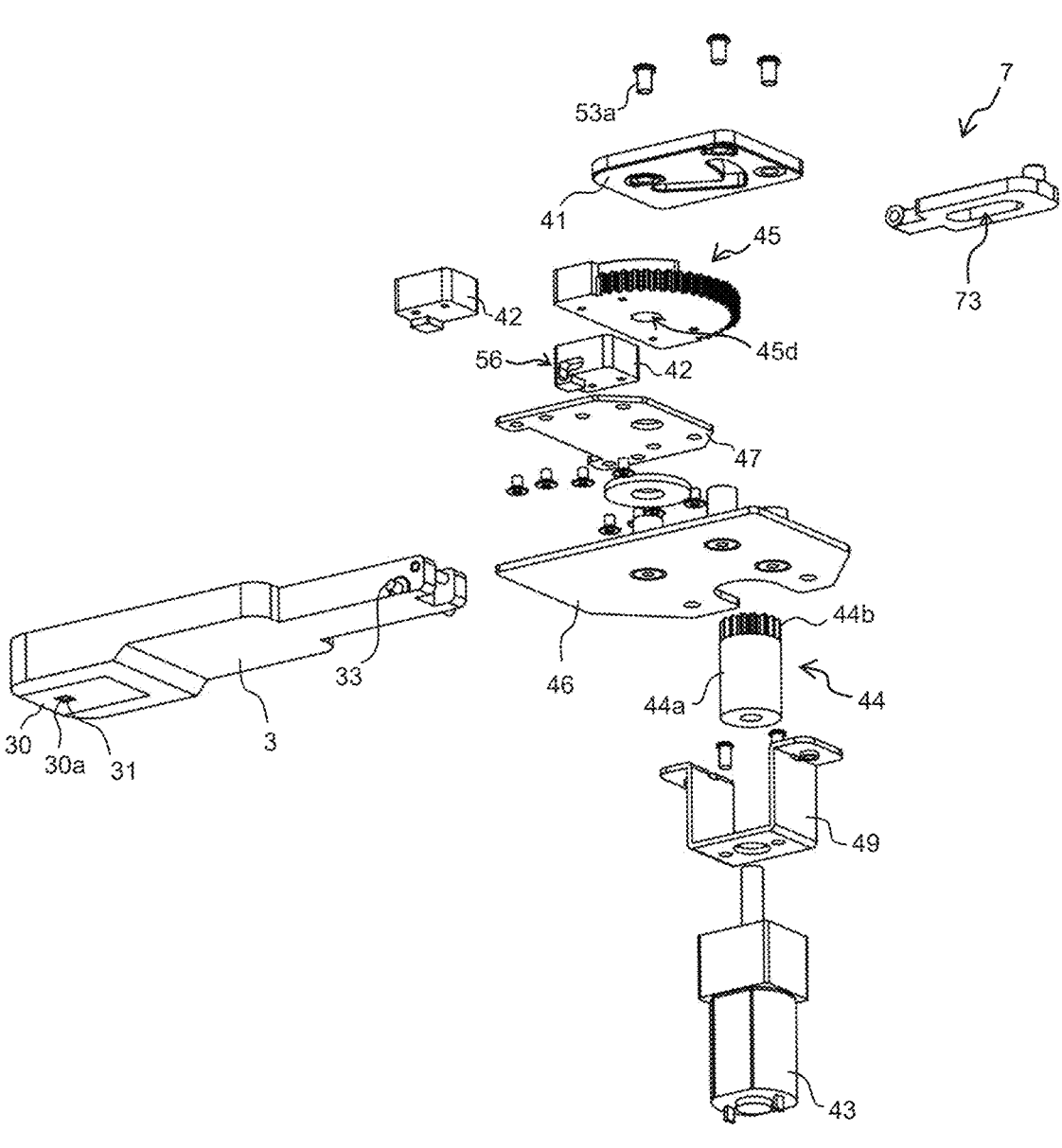
FIG. 5 is an exploded perspective view from below of the sensor unit drive device 2 according to the first embodiment.
Figure 6:
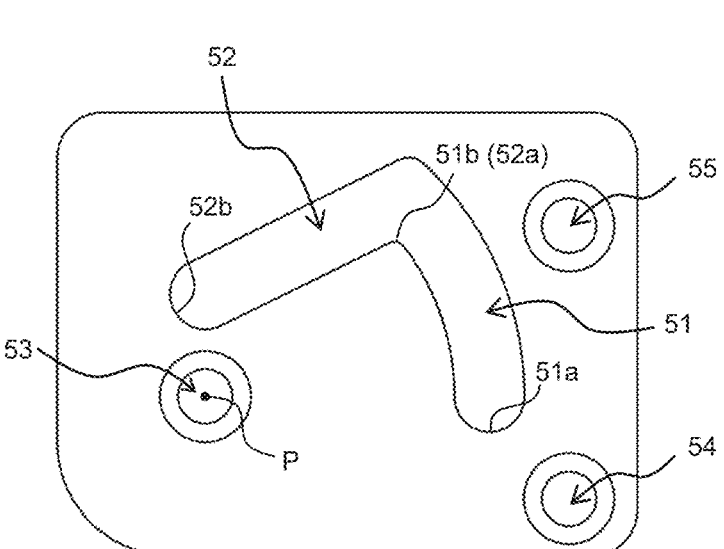
FIG. 6 is a plan view of the first cam 41 of the sensor unit drive device 2 according to the first embodiment.
Figure 7:
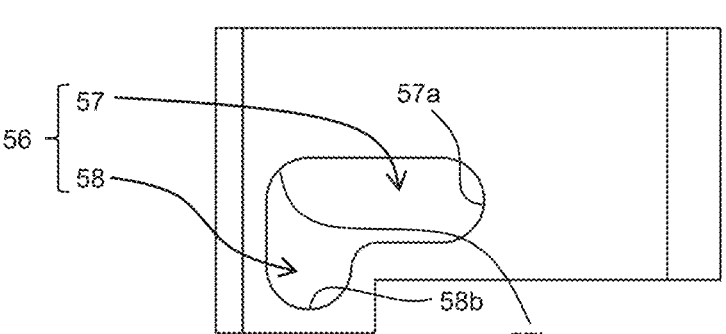
FIG. 7 is a side view of a second cam 42 of the sensor unit drive device 2 according to the first embodiment.

FIGS. 1A and 1B are perspective views of a display device 1 including a sensor unit drive device 2 according to the first embodiment. In the following description, the up-down, front-back, and left-right directions of the display device 1 are defined as shown in FIG. 1A. In other words, the vertical direction is defined as the up-down direction, the directions toward the left and right sides toward the display surface 11*a* are defined as the left direction and the right direction, respectively, and the directions toward the front and back toward the display surface 11*a* are defined as the front direction and the back direction, respectively. The display device 1 includes a display panel 11 having a display surface 11*a* that displays an image on the front side. The display device 1 also includes a cabinet 12 that at least partially covers the side and back surfaces (rear surface) of the display panel 11, and a bezel 13 is provided on the periphery of the side surface of the display panel 11, specifically, on the periphery of the upper side surface. Here, the side surface of the display panel 11 refers to any one of four surfaces connecting the front and rear surfaces of the display panel 11.

As shown in FIGS. 2 to 5, the sensor unit drive device 2 includes a sensor unit 3 having a sensor 31, and a drive means 4 connected to the sensor unit 3 and driving the sensor unit 3. The sensor 31 is configured to measure optical characteristics of the display panel 11, such as physical quantities such as brightness and chromaticity of the display surface 11*a*.

The sensor unit 3 is arranged on the side surface of the display panel 11 in a retracted position shown in FIG. 1A, and is arranged so that the sensor 31 faces the display surface 11*a* in a detection position shown in FIG. 1B. When the drive means 4 drives the sensor unit 3, the sensor unit 3 moves and switches between the retracted position and the detection position. The sensor unit 3 of this embodiment is arranged on the upper side of the display panel 11 in the retracted position, and is stored in the cabinet 12. As shown in FIG. 1B, an opening 14 is formed in the front surface of the bezel 13, and the sensor unit 3 is taken in and out through the opening 14. Although not shown in FIGS. 1A and 1B from the viewpoint of visibility, the opening 14 is provided with a lid that can be opened and closed using a hinge structure. When the sensor unit 3 is in the retracted position, the opening 14 is closed by the lid, and the biasing force of a spring (not shown) acts in the direction of closing the lid. When the sensor unit 3 starts moving from the retracted position to the detection position, the tip of the sensor unit 3 pushes open the lid against the biasing force of the spring and protrudes from the opening 14. When the sensor unit 3 moves from the detection position to the retracted position and is stored in the cabinet 12, the lid is automatically closed by the biasing force of the spring. Furthermore, the sensor unit is not limited to being stored inside the cabinet, but may be placed outside the cabinet. In this case, the opening 14 in the bezel is not required.

The sensor unit 3 is a plate-shaped component, and the sensor 31 is provided on the tip side of the lower surface in the retracted position, and a hinge structure 32 is provided on the base end side connected to the drive means 4. Further, a bending movement pin 33 is provided on the base end side of the sensor unit 3, and both ends of the bending movement pin 33 protrude from a pair of opposing side surfaces of the sensor unit 3, respectively.

A rectangular light shielding member (cushion member) 30 is attached and fixed to the lower surface of the sensor unit 3 with adhesive means such as double-sided tape or adhesive. A rectangular lighting window 30*a* is hollowed out approximately in the center of the light shielding member 30 so that the sensor 31 can receive light from the display surface 11*a* while surrounding the sensor 31. When the sensor unit 3 is at the detection position, the lighting window 30*a* of the light shielding member 30 and the display surface 11*a* are in parallel and close to each other. As the material for the light shielding member 30, for example, paper, resin sheet, flocked paper, flocked sheet, felt, sponge, rubber, or elastomer can be used, and it is preferable to use flocked paper or flocked sheet. This is because flocked paper and flocked sheets have excellent light absorbing ability and cushioning properties, so they can effectively block light while suppressing the load on the display surface 11*a*.

The sensor unit drive device 2 of this embodiment includes a slide component 7, the slide component 7 is connected to the hinge structure 32 and provided on the base end side of the sensor unit 3. The slide component 7 includes a connection part 71 connected to the hinge structure 32 and a rotational movement pin 72 that projects upward at an end opposite to the connection part 71. Furthermore, a slot-shaped through hole 73 is formed along the longitudinal direction of the slide component 7 between the connection part 71 and the rotational movement pin 72. The other end of the boss 46*a*, one end of which is fixed to the first base 46, is inserted into the slot-shaped through hole 73. The outer diameter of the boss 46*a* is designed to be slightly smaller than the width of the slot-shaped through hole 73, so that the slide component 7 can move relative to the boss 46*a* along the longitudinal direction.

The drive means 4 is provided across the side surface side (in this embodiment, the upper side surface side) and the back surface side of the display panel 11 where the sensor unit 3 in the retracted position is arranged. The drive means 4 includes a first cam 41, a second cam 42, and an actuator 43. In addition, the drive means 4 includes a pinion member 44 and a gear member 45 for transmitting the power generated by the actuator 43, a first base 46 for attaching the drive means 4 to the display device 1, a second base 47 where the gear member 45 and the second cam 42 are arranged, a washer 48 interposed between the first base 46 and the second base 47, and a holder 49 for attaching the actuator 43 to the first base 46. These parts are connected to each other by screws or bosses. In addition, in this embodiment, the above-mentioned component parts produced separately are connected, but some of the above-mentioned constituent parts may be produced as an integral part. For example, the gear member 45, the second cam 42, and the second base 47 may be produced as an integral part.

As shown in FIGS. 2, 4, 5, and 6, the first cam 41 is a flat plate-shaped component, and has a first groove 51 and a second groove formed continuously with the first groove 51. A first screw hole 53 is formed near the end of the second groove 52, and a second screw hole 54 and a third screw hole 55 are formed near the first groove 51, and the first cam 41 is fixed to the first base 46 by screws inserted into each screw hole and a boss. The first groove 51 is formed in an arc shape from a starting end 51*a* to a terminal end 51*b*, the center of the arc approximately coincides with the center P of the first screw hole 53, and the center angle of the arc is approximately 45°. When the terminal end 51*b* of the first groove 51 is the starting end 52*a*, the second groove 52 is formed in a straight line up to the terminal end 52*b* of the second groove 52 formed near the first screw hole 53 in a direction approximately toward the first screw hole 53 from the starting end 52*a*. A rotational movement pin 72 of the slide component 7 is inserted into the first groove 51 and the second groove 52, and the rotational movement pin 72 is configured to be movable along each groove.

As shown in FIGS. 2 to 6 and 7, the second cam 42 is a pair of substantially rectangular parallelepiped-shaped parts, is arranged to sandwich the sensor unit 3, and is screwed onto the second base 47 at the bottom surface. A third groove 56 is formed on the side surface of each second cam 42 facing the sensor unit 3. The third groove 56 is an L-shaped groove as a whole, and includes a first part 57 extending from a starting end 57*a* to a terminal end 57*b* along the direction from the base end to the tip of the sensor unit 3 in the retracted position, and a second part 58 extending from the starting end 58*a* to the terminal end 58*b* in a direction perpendicular to the first part 57 when the terminal end 57*b* of the first part 57 is the starting end 58*a*. In this embodiment, the first part 57 extends horizontally from the starting end 57*a* to the terminal end 57*b*, and the second part 58 extends vertically downward from the starting end 58*a* to the terminal end 58*b*. Both ends of the bending movement pin 33 of the sensor unit 3 are inserted into the third groove 56, and the bending movement pin 33 is configured to be movable along the third groove 56.

The actuator 43 of this embodiment is a motor that converts electrical energy into rotational movement and transmits it to the gear member 45 via the pinion member 44. The gear member 45 is arranged below the first cam 41 and is fixed to the second base 47 at the bottom surface by screwing. The gear member 45 includes a gear part 45*a* that is approximately semicircular in planar view, and a pair of protrusions 45*b* that protrude upward from the gear part 45*a*. The slide component 7 is placed in the placement groove 45c between the pair of protrusions 45b so as to be slidable along the placement groove 45c. Gear teeth are provided on the gear part 45a along a semicircular arc. An insertion hole 45d is formed in the center of the semicircle, and the gear member 45 is rotatable about a boss 46a inserted into the insertion hole 45d as a rotation axis. When the rotational movement of the actuator 43 is transmitted to the gear member 45, the gear member 45 rotates, as a result, the slide component 7 placed in the placement groove 45c, the second base 47 where the gear member 45 is fixed, and the pair of second cams 42 fixed on the second base 47 rotate integrally.

The insertion hole 45d of the gear member 45, the slot-shaped through hole 73 of the slide component 7 placed in the placement groove 45c, and the first screw hole 53 of the first cam 41 are arranged so as to be continuous in the vertical direction. A screw 53a screwed into the first screw hole 53 is attached to the boss 46a inserted into the insertion hole 45d and the slot-shaped through hole 73. The pinion member 44 includes a cylindrical part 44a having a cylindrical shape and connected to the actuator 43, and a gear part 44b provided on an end surface of the cylindrical part 44a. Gear teeth that mesh with the gear teeth of the gear member 45 are formed on the side surface of the gear part 44b.

Figure 8A:
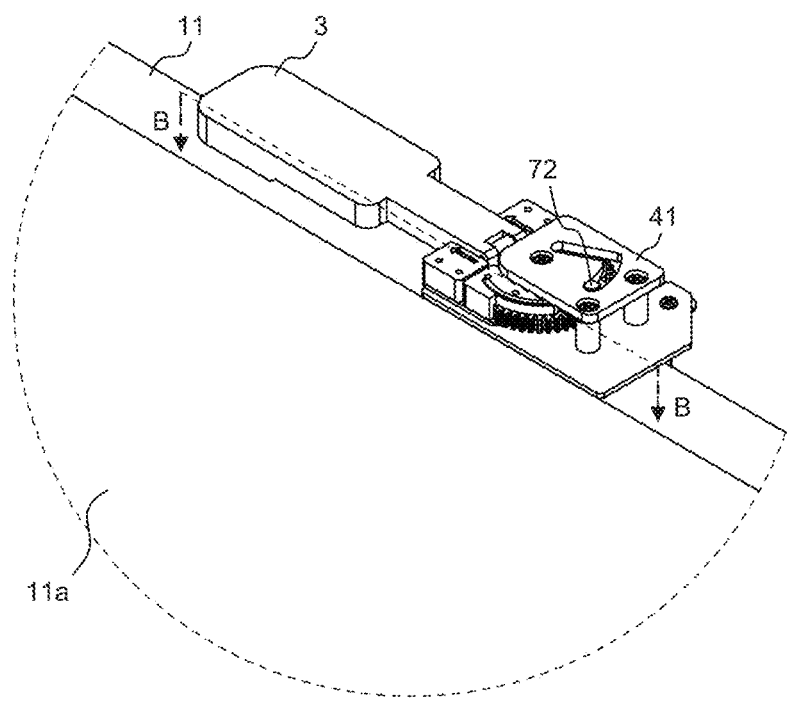
FIG. 8A is a diagram schematically illustrating an operation of the sensor unit drive device 2 in section A of FIG. 1A, and shows a state where the sensor unit 3 is in a retracted position.
Figure 10A:
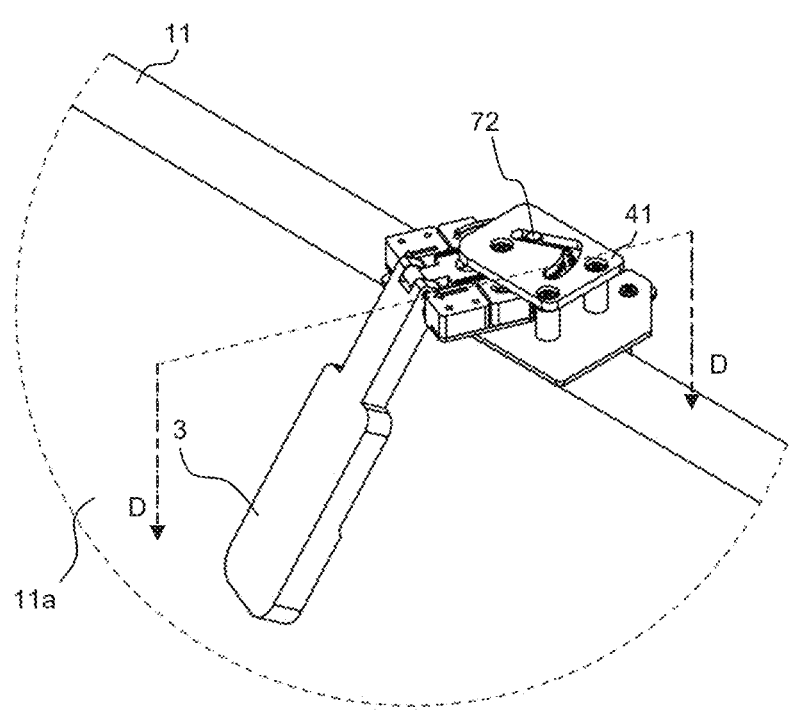
FIG. 10A is a diagram showing a state where the sensor unit 3 further performed a rotational movement and a bending movement from the state shown in FIG. 9A.
Figure 11A:
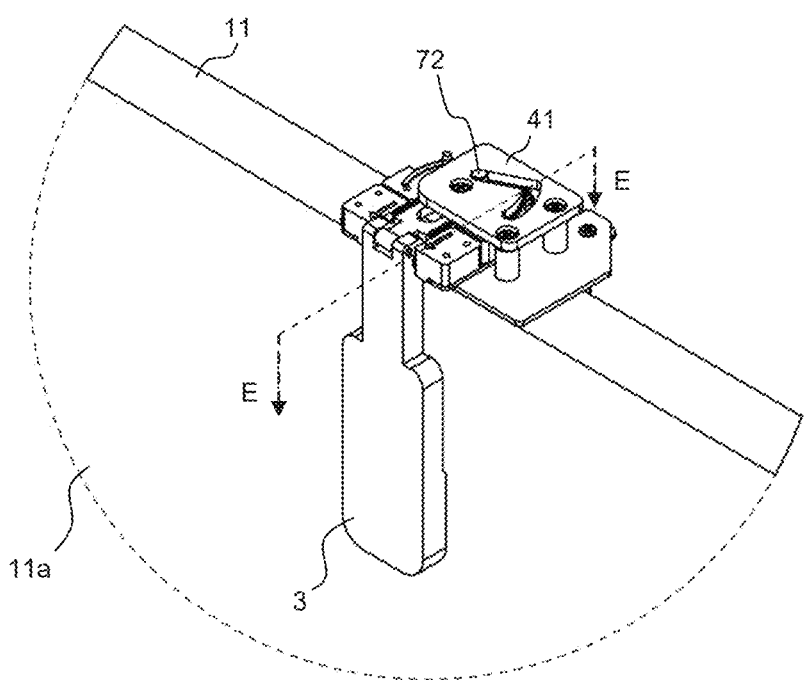
FIG. 11A is a diagram showing a state where the sensor unit 3 moved from the state shown in FIG. 10A to a detection position.
Figure 11B:
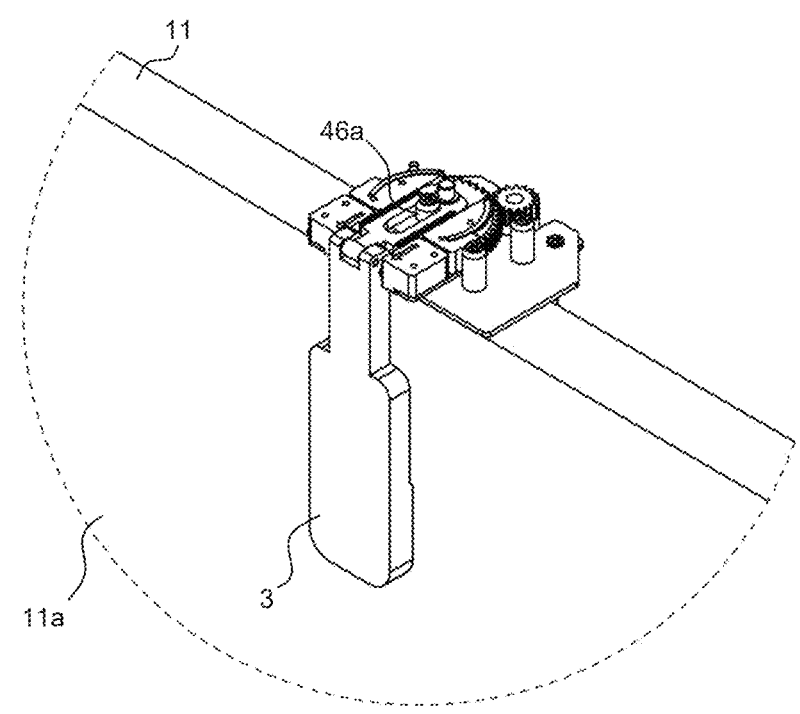
FIG. 11B is a diagram showing a state where the first cam 41 is removed from FIG. 11A.
Figure 12A:
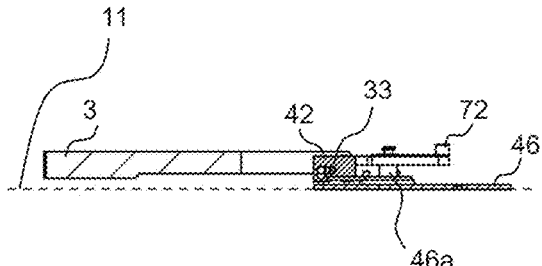
FIG. 12A is a schematic cross-sectional view taken along line BB in FIG. 8A.
Figure 12B:
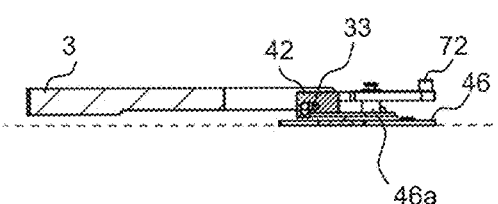
FIG. 12B is a schematic cross-sectional view taken along line CC in FIG. 9A.
Figure 12C:
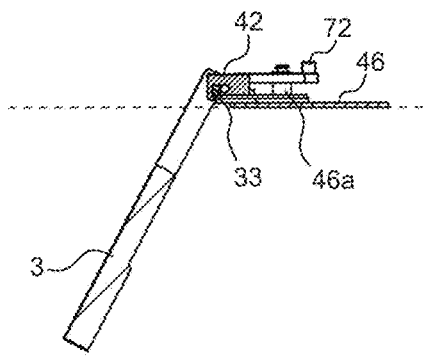
FIG. 12C is a schematic cross-sectional view taken along line DD in FIG. 10A.
Figure 12D:
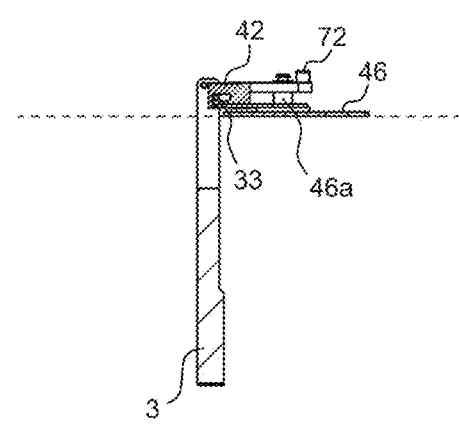
FIG. 12D is a schematic cross-sectional view taken along line EE in FIG. 11A.

Next, the movement of the sensor unit drive device 2 will be described with reference to FIGS. 8A to 12D. FIGS. 8A to 11B schematically illustrate the movement in section A of FIG. 1A, and the cabinet 12 and bezel 13 are omitted in the figures. FIGS. 12A to 12D are schematic cross-sections on a plane including the third groove 56 of the second cam 42 in the states of FIGS. 8A, 9A, 10A, and 11A. Specifically, FIG. 12A shows a schematic cross-section taken along line BB in FIG. 8A, FIG. 12B shows a schematic cross-section taken along line CC in FIG. 9A, FIG. 12C shows a schematic cross-section taken along line DD in FIG. 10A, and FIG. 12D shows a schematic cross-section taken along line EE in FIG. 11A. It is noted that in FIGS. 12A to 12B, components other than the sensor unit 3, slide component 7, second cam 42, boss 46a, and first base 46 are omitted or simplified from the viewpoint of visibility. Further, the broken line in the figure indicates the height of the upper side of the display panel 11.

Figure 8B:
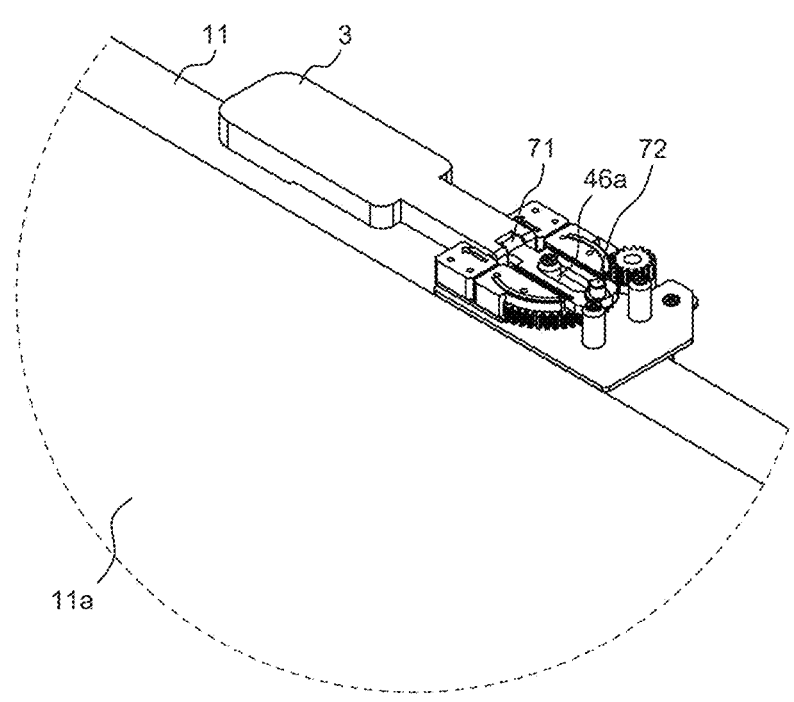
FIG. 8B is a diagram showing a state where the first cam 41 is removed from FIG. 8A.
Figure 9A:
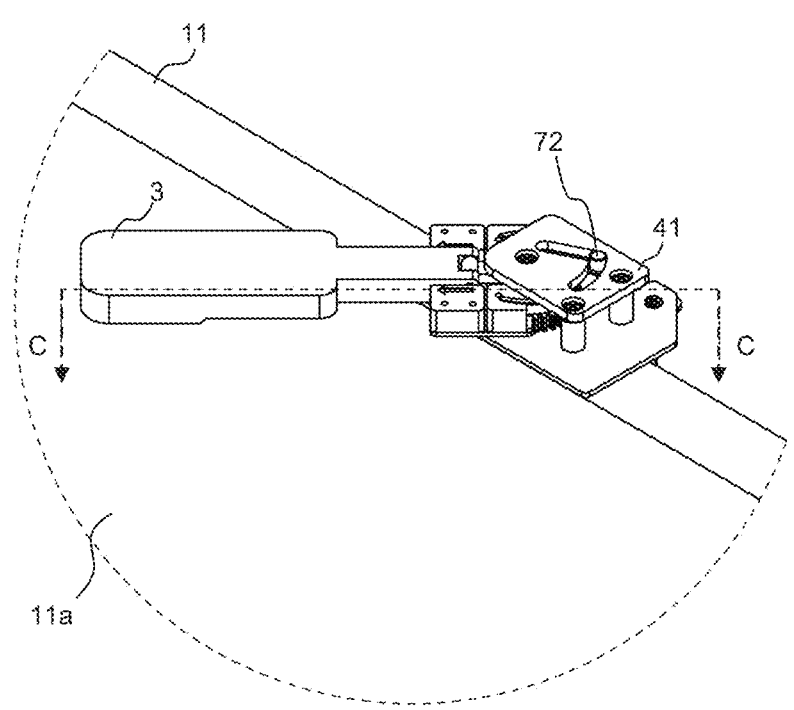
FIG. 9A is a diagram showing a state where the sensor unit 3 performed a rotational movement from the retracted position of FIG. 8A.

In the retracted position shown in FIGS. 8A and 8B, the sensor unit 3 is arranged on the upper side of the display panel 11. In this state, the rotational movement pin 72 of the slide component 7 is located at the starting end 51a of the first groove 51, and the boss 46a is located at the end of the slot-shaped through hole 73 on the connection part 71 side. Further, as shown in FIG. 12A, the bending movement pin 33 of the sensor unit 3 is located at the starting end 57a of the first part 57 of the third groove 56. When the drive means 4 drives the sensor unit 3, the gear member 45 rotates about the boss 46a as a rotation axis. The slide component 7 placed in the placement groove 45c rotates about the boss 46a as the rotation axis as the rotational movement pin 72 moves along the first groove 51 of the first cam 41 as the gear member 45 rotates. As a result, the sensor unit 3 connected to the slide component 7 swivels and rotates to the state shown in FIGS. 9A and 9B. At this time, the sensor unit 3 is in a state of protruding from the bezel 13 due to the rotational movement. Further, swivel rotation in the present invention refers to a rotational movement in which the sensor unit 3 swivels and rotates from the retracted position around a rotation axis that is non-perpendicular to the display surface 11a and along the side of the display panel 11 where the sensor unit 3 in the retracted position is located. The sensor unit 3 of this embodiment swivels and rotates counterclockwise in planar view along the upper surface of the display panel 11 around a rotation axis parallel to the display surface 11a, specifically around the boss 46a as the rotation axis.

Figure 9B:
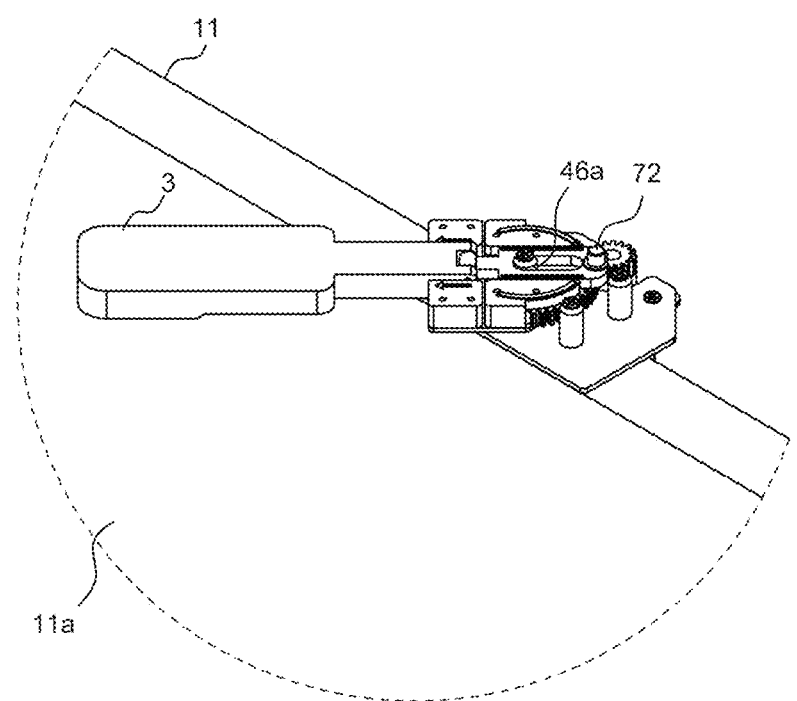
FIG. 9B is a diagram showing a state where the first cam 41 is removed from FIG. 9A.

In the state shown in FIGS. 9A and 9B, the rotational movement pin 72 is located at the terminal end 51b of the first groove 51. In this embodiment, since the central angle of the arc of the first groove 51 is designed to be approximately 45 degrees, the sensor unit 3 is also in a state of approximately 45° swivel rotation around the axis of rotation. It is noted that the central angle of the arc of the first groove 51 is not limited to this example, and the design can be changed as appropriate. In this state, the boss 46a remains located at the end on the connection part 71 side of the slot-shaped through hole 73. Further, as shown in FIG. 12B, the bending movement pin 33 of the sensor unit 3 remains located at the starting end 57a of the first part 57 of the third groove 56.

When the gear member 45 further rotates from the state shown in FIGS. 9A and 9B, the rotational movement pin 72 moves from the terminal end 51b of the first groove 51 along the second groove 52, and at the same time, the slide component 7 moves relative to the boss 46a along its longitudinal direction. That is, the slide component 7 moves toward the sensor unit 3 along the placement groove 45c. As the slide component 7 moves, the sensor unit 3 performs a bending movement to bend toward the display surface 11a via the hinge structure 32 as the bending movement pin 33 moves along the third groove 56 while performing the rotational movement. That is, the sensor unit 3 starts the bending movement in the middle of the rotational movement started from the retracted position. Specifically, when the bending movement pin 33 moves from the starting end 57a of the first part 57 of the third groove 56 toward the terminal end 57b, thereby the sensor unit 3 moves in the direction in which it is pushed out from the pair of second cams 42. After contacting the terminal end 57b of the first part 57, the bending movement pin 33 moves along the second part 58, thereby bending the sensor unit 3 toward the display surface 11a.

Figure 10B:
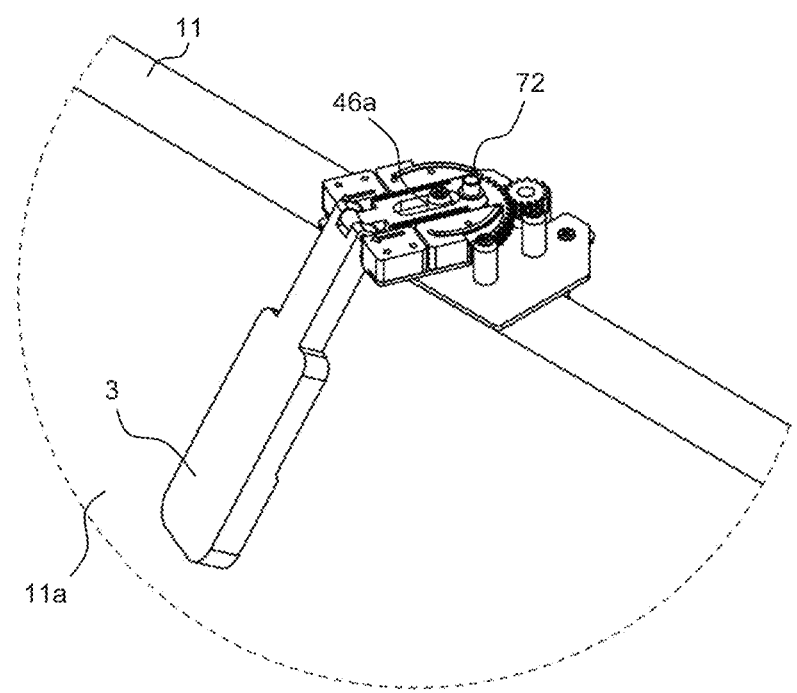
FIG. 10B is a diagram showing a state where the first cam 41 is removed from FIG. 10A.

FIGS. 10A and 10B are diagrams showing the sensor unit 3 in the middle of a bending movement. In this state, the rotational movement pin 72 is located midway in the second groove 52, and the boss is located midway in the slot-shaped through hole 73 in the longitudinal direction. Further, as shown in FIG. 12C, the bending movement pin 33 of the sensor unit 3 is located at the terminal end 58b of the second part 58 of the third groove 56. FIGS. 11A and 11B are diagrams showing a state where the sensor unit 3 further performs a rotational movement and a bending movement from the state shown in FIGS. 10A and 10B and is placed at a detection position. In this state, the rotational movement pin 72 is located at the terminal end 52b of the second groove 52, and the boss 46a is located at the end on the rotational movement 72 side of the slot-shaped through hole 73. Further, as shown in FIG. 12D, the bending movement pin 33 of the sensor unit 3 is located at the starting end 58a of the second part 58 of the third groove 56. The sensor unit 3 is swiveled and rotated by 90 degrees from the state where it is disposed in the direction along the upper surface of the display panel 11 in the retracted position, and is bent by 90 degrees. This allows the sensor 31 to face the display surface 11a and measure the optical characteristics of the display panel 11. Furthermore, by performing the above series of movements in the reverse order, the sensor unit 3 can be moved from the detection position to the retracted position and stored in the cabinet 12.

As shown in FIGS. 12A to 12D, while the sensor unit 3 is bent by 90 degrees, the slide component 7 is moving horizontally along its longitudinal direction, and the vertical position of the connection part 71 and the rotational movement pin 72 is does not change. The bending movement pin 33 moves from the starting end 57a to the terminal end 57b of the first part 57 of the third groove 56, moves along the second part 58 to the terminal end 58b, and then moves from the terminal end 58b of the second part 58 to the starting end 58a. The sensor unit 3 is bent so as to rotate around the bending movement pin 33 that moves along the third groove 56 using the bending movement pin 33 as a rotation axis, via the hinge structure 32. In this configuration where the bending movement pin 33 serving as the rotation axis of the bending movement is movable along the third groove 56, the vertical position of the slide component 7 does not change during the bending movement of the sensor unit 3. Therefore, the slide component 7 can stably slide along the placement groove 45c, and the rotational movement pin 72 can stably move within the second groove 52 of the first cam 41.

In the configuration of the sensor unit drive device 2 described above, the sensor unit 3 is disposed on the side surface side of the display panel 11 in the retracted position, and when driven by the drive means 4, moves to the detection position by rotational movement and bending movement. With such a configuration, there is no need for the bezel 13 to protrude forward, and the width of bezel 13 can be reduced to the same level as the thickness of sensor unit 3. Even a relatively large sensor unit 3 capable of measuring near the center of the display surface 11a can be stored in the retracted position, and can be smoothly moved between the retracted position and the detection position.

By using the first and second cams 41 and 42 to configure the drive means 4, and by allowing the rotational movement pin 72 of the slide component 7 to move along the first and second grooves 51 and 52, and the bending movement pin 33 of the sensor unit 3 to move along the third groove 56, one actuator 43 can drive both the rotational movement and the bending movement of the sensor unit 3.

1.2. Modification 1

Figure 13:
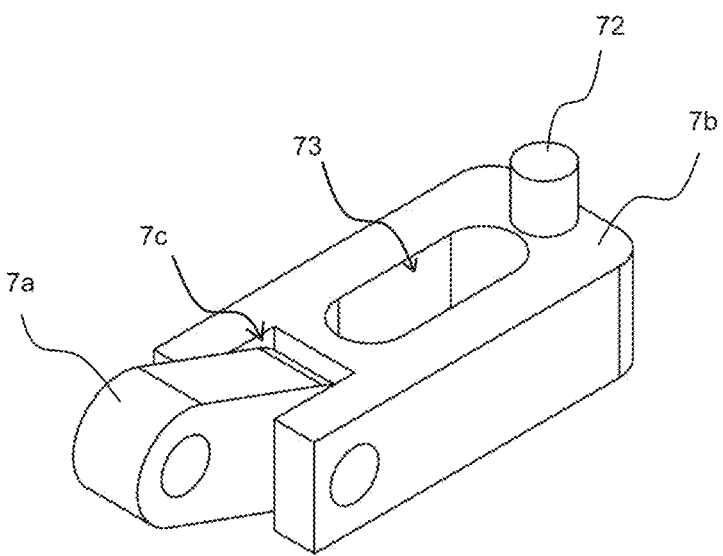
FIG. 13 is a perspective view of the slide component 7 according to a modification 1 of the first embodiment.

In the first embodiment, the bending movement pin 33, which is the axis of rotation for the bending movement, is movable along the third groove 56, but the bending movement pin 33 can be configured not to move relative to the second cam 42 during the bending movement. In that case, the vertical position of the slide component 7 changes when the sensor unit 3 is bent. Therefore, it is necessary to adjust the height of the placement groove 45c and the protruding length of the rotational movement pin 72 as appropriate. Alternatively, a slide component 7 made of two members as shown in FIG. 13 may be used. The slide component 7 of this modification is connected to the hinge structure 32 of the sensor unit 3 and is provided on the base end side of the sensor unit 3 similarly to the slide component 7 of the first embodiment. However, it differs from the first embodiment in that it has the first member 7a connected to the hinge structure 32 and the second member 7b connected to the first member 7a, and the first member 7a is configured to be rotatable with respect to the second member 7b. The connection part 7c between the first member 7a and the second member 7b has a hinge structure. Further, a rotational movement pin 72 is provided at the end of the second member 7b on the opposite side to the connection part 7c.

The bending movement pin 33 of the sensor unit 3 in this modification is inserted so that it does not move relative to the second cam 42 but can only rotate. While the sensor unit 3 is bent by 90 degrees, the first member 7a rotates upward around the connection part 7c from a state parallel to the second member 7b, then rotates downward, and returns to the state parallel to the second member 7b. On the other hand, although the second member 7b moves horizontally along its longitudinal direction, the vertical position of the rotational movement pin 72 does not change. In such a configuration, the first member 7a absorbs the change in the vertical position of the slide component 7, and the vertical position of the second member 7b does not change. Therefore, there is no need to adjust the height of the placement groove 45c or the protruding length of the rotational movement pin 72 in order to cope with changes in position in the vertical direction.

1.3. Modification 2

Figure 14:
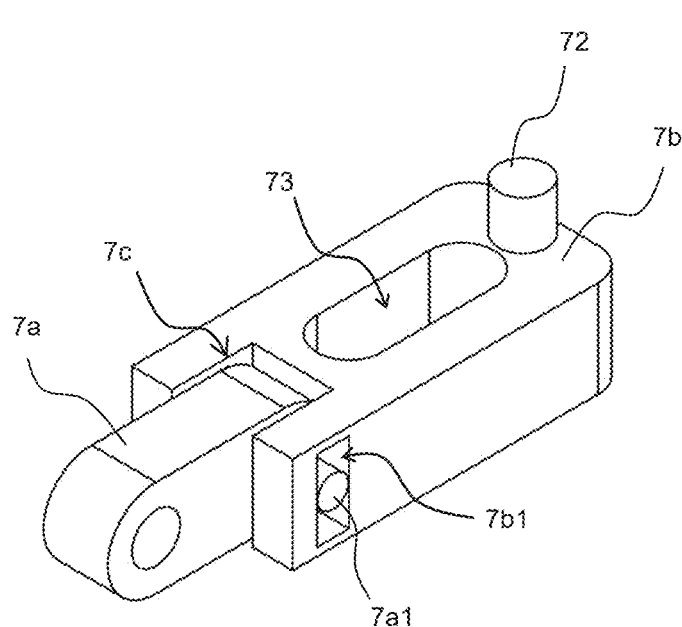
FIG. 14 is a perspective view of the slide component 7 according to a second modification of the first embodiment.

FIG. 14 is a diagram showing another example of the slide component 7 consisting of two members. In the slide component 7 of Modification 1, the first member 7a is configured to be rotatable relative to the second member 7b. In contrast, in the slide component 7 of this modification, the first member 7a is configured to be movable relative to the second member 7b in a uniaxial direction (in this example, in the vertical direction). The first member 7a is provided with a projection part 7a1 that protrude from a pair of opposing side surfaces, respectively. The projection part 7a1 is inserted into a long hole 7b1 provided in the second member 7b, and is movable in the vertical direction along the longitudinal direction of the long hole 7b1 in the long hole 7b1.

While the sensor unit 3 is bent by 90 degrees, the projection part 7a1 moves along the long hole 7b1, so that the first member 7a moves upward relative to the second member 7b, and then moves downward and returns to the state shown in FIG. 14. On the other hand, although the second member 7b moves horizontally along its longitudinal direction, the vertical position of the rotational movement pin 72 does not change. Even in such a configuration, the vertical position of the second member 7b does not change. Therefore, there is no need to adjust the height of the placement groove 45c or the protruding length of the rotational movement pin 72 in order to cope with changes in position in the vertical direction.

1.4. Modification 3

In the first embodiment, the drive means 4 is provided across the side surface and back surface sides of the display panel 11, but the drive means 4 may be provided on the side surface side of the display panel 11. Specifically, the pinion member 44 and actuator 43, which are arranged on the back surface side of the display panel 11 in the first embodiment, may be arranged on the side surface side of the display panel 11. For example, in the first embodiment, the gear part 45a of the gear member 45 and the gear part 44b of the pinion member 44 are formed in the shape of a spur gear. However, it is also possible to use a worm gear mechanism where the gear part 45a of the gear member 45 is formed in the shape of a worm wheel, and the gear part 44b of the pinion member 44 is formed in the shape of a worm. In this case, the rotation axis of the gear part 44b of the pinion member 44 is parallel to the side surface (the upper surface in the first embodiment) of the display panel 11, and it becomes possible to arrange the pinion member 44 and the actuator 43 on the side surface side of the display panel 11.

1.5. Modification 4

In the first embodiment, one actuator 43 is configured to drive both the rotational movement and the bending movement of the sensor unit 3. However, the drive means 4 may be provided with two actuators 43, one actuator 43 driving the rotational movement, and the other actuator 43 driving the bending movement. In this case, compared to the drive means 4 of the first embodiment, the number of actuators 43 increases, but the first cam 41, the second cam 42, and the slide component 7 become unnecessary. It is noted that the sensor unit 3 may be directly driven by the power generated by the two actuators 43, or may be indirectly driven by disposing a power transmission part such as a gear between one or both of the actuators 43 and the sensor unit 3. Further, the driving of the rotational movement by one actuator 43 and the driving of the bending movement by the other actuator 43 may be started at the same time.

Also, the driving of the bending movement may be started during the rotational movement, or the bending movement may be started after the rotational movement is completed.

2. Second Embodiment

Next, a sensor unit drive device 2 according to a second embodiment of the present invention will be described, focusing on the differences from the first embodiment. The first sensor unit drive device 2 according to the second embodiment differs in the configuration of the drive means 4.

Figure 15A:
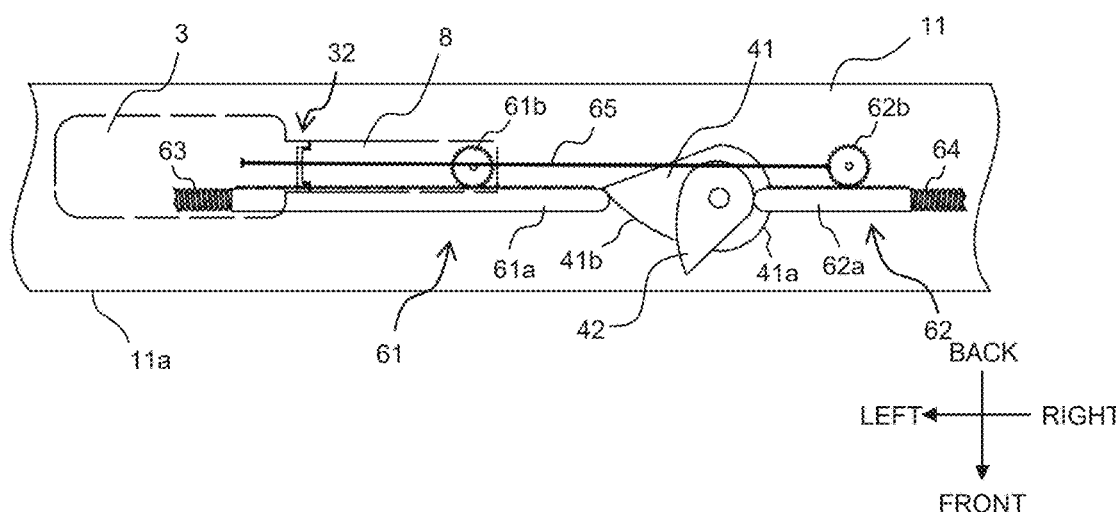
FIG. 15A is a diagram showing a state where the sensor unit 3 is in the retracted position.
Figure 15B:
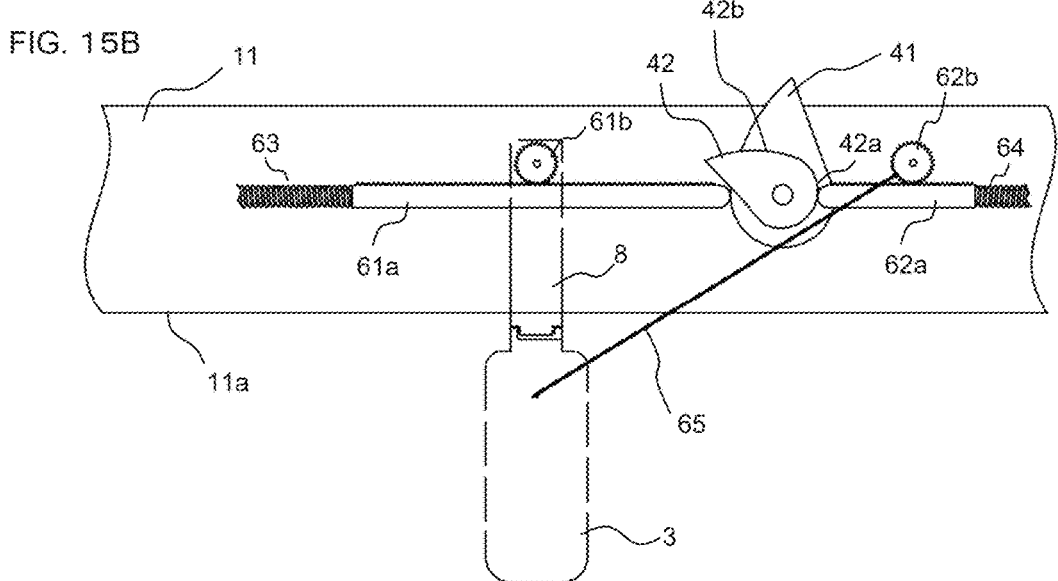
FIG. 15B is a diagram showing a state where the sensor unit 3 performed a rotational movement from the retracted position.
Figure 15C:
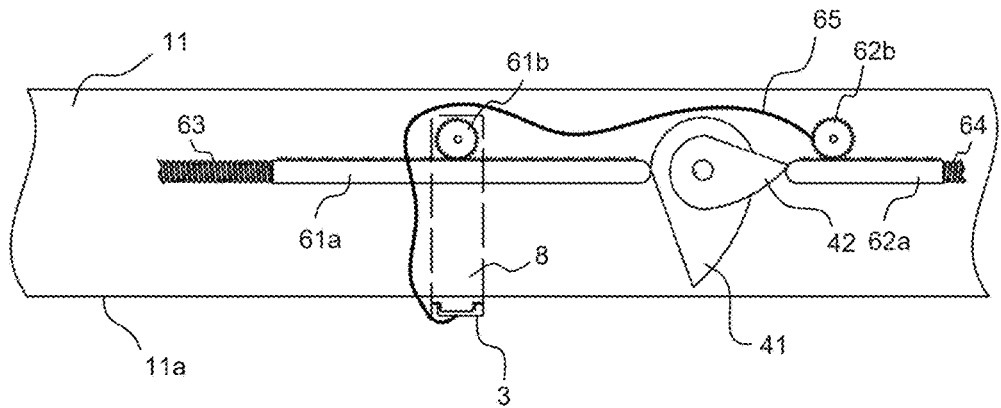
FIG. 15C is a diagram showing a state where the sensor unit 3 is in the detection position.

FIGS. 15A to 15C are schematic diagrams showing the movement of the sensor unit drive device 2 according to the second embodiment, and are schematic diagrams of the movement mode of the sensor unit drive device 2 viewed from directly above. In the retracted position shown in FIG. 15A, the sensor unit 3 indicated by the broken line is arranged on the upper surface side of the display panel 11. The sensor unit 3 is provided with a hinge structure 32, and the sensor unit 3 is bendable around the hinge structure 32. Further, a biasing member (not shown) is attached to the hinge structure 32, and a biasing force acts in a direction to bend the sensor unit 3 around the hinge structure 32 toward the display surface 11a. The biasing member is, for example, a torsion coil spring. The sensor unit 3 is connected to the drive means 4 via a connection member 8.

The drive means 4 includes a first cam 41, a second cam 42, a first rack and pinion mechanism 61, a second rack and pinion mechanism 62, a first biasing member 63, a second biasing member 64, and an actuator 43 (not shown) capable of rotationally driving the first cam 41 and the second cam 42. The first cam 41 and the second cam 42 are configured to be rotatable around the same axis. Further, the side surfaces of the first cam 41 and the second cam 42 have a first circular arc surface 41a and a second circular arc surface 42a formed in an arc shape centered on the rotation axis in a planar view, and a first curved surface 41b and a second curved surface 42b where distance from the rotation axis changes, respectively. The first rack and pinion mechanism 61 includes a first rack 61a and a first pinion 61b. The first rack 61a has a tip in contact with the first cam 41, and is biased in a direction toward the first cam 41 (rightward in FIG. 15A) by the first biasing member 63 disposed on the base end side. The first biasing member 63 is, for example, a compression spring. The first pinion 61b has gear teeth engaged with the first rack 61a, and a rotating shaft connected to the connection member 8. With such a configuration, when the first pinion 61b rotates, the sensor unit 3 rotates around the rotation axis of the first pinion 61b.

The second rack and pinion mechanism 62 includes a second rack 62a and a second pinion 62b. The second rack 62a has a tip in contact with the second cam 42, and is biased in a direction toward the second cam 42 (leftward in FIG. 15A) by the second biasing member 64 disposed on the base end side. The second biasing member 64 is, for example, a compression spring. The gear teeth of the second pinion 62b engage with the second rack 62a. Further, a wire bobbin (not shown) storing a wire 65 is attached to the second pinion 62b, and when the second pinion 62b rotates in one direction (counterclockwise in FIG. 15A), the wire 65 is continuously pulled out from the wire bobbin, and when it rotates in the other direction (clockwise in FIG. 15A), the wire 65 is wound onto the wire bobbin.

One end of the wire 65 is connected to the sensor unit 3. In the retracted position shown in FIG. 15A, the wire 65 is stretched between the sensor unit 3 and the wire bobbin under tension. Due to the tension of the wire 65, the sensor unit 3 is not bent against the biasing force of the biasing member attached to the hinge structure 32, but is disposed in the horizontal direction.

Next, the movement of the sensor unit drive device 2 of this embodiment will be explained. When the actuator 43 operates from the state shown in FIG. 15A, the first cam 41 and the second cam 42 rotate clockwise. The first rack 61a moves rightward while the tip thereof contacts the first curved surface 41b of the first cam 41 due to the biasing force of the first biasing member 63. As the first rack 61a moves, the first pinion 61b rotates counterclockwise, as a result, the sensor unit 3 performs a rotational movement of swiveling and rotating along the upper surface of the display panel 11 around the rotation axis parallel to the display surface 11a, and becomes in the state shown in FIG. 15B where it protrudes from the bezel 13. While the sensor unit 3 is performing the rotational movement, the second rack 62a is in contact with the second circular arc surface 42a of the second cam 42, so it does not move in the left-right direction, and the second pinion 62b does not rotate. Therefore, the tension of the wire 65 maintains the sensor unit 3 in an unbent state.

When the first cam 41 and the second cam 42 further rotate clockwise from the state where the sensor unit 3 was swiveled and rotated by 90 degrees from the retracted position as shown in FIG. 15B, the sensor unit 3 starts to bend toward the display surface 11a. Specifically, the tip of the second rack 62a comes into contact with the second curved surface 42b of the second cam 42, so that the second rack 62a moves to the right direction against the biasing force of the second biasing member 64. As the second rack 62a moves, the second pinion 62b rotates counterclockwise, thereby pulling out the wire 65 from the wire bobbin. As the wire 65 loosens and the tension decreases, the sensor unit 3 bends around the hinge structure 32 due to the biasing force of the biasing member attached to the hinge structure 32. FIG. 15C is a diagram showing a state where the sensor unit 3 is bent at 90 degrees toward the display surface 11a and placed at the detection position. While the sensor unit 3 is performing the bending movement, the first rack 61a is in contact with the first circular arc surface 41a of the first cam 41, so it does not move in the left-right direction, and the first pinion 61b does not rotate. Therefore, the sensor unit 3 does not perform a rotational movement during a bending movement. Furthermore, by performing the above series of movements in the reverse order, the sensor unit 3 can be moved from the detection position to the retracted position and stored in the cabinet 12.

Also in the configuration of the second embodiment, the sensor unit 3 is disposed on the side surface side of the display panel 11 in the retracted position, and can be smoothly moved between the retracted position and the detection position by rotational movement and bending movement. Further, by configuring the drive means 4 using the first cam 41 and the second cam 42, one actuator 43 can drive both the rotational movement and the bending movement of the sensor unit 3.

It is noted that in the above configuration, the bending movement is started after the sensor unit 3 swiveled and rotated by 90 degrees, but the timing of the rotational movement and the bending movement is not limited to this. By changing the shapes of the first cam 41 and the second cam 42, it is possible to start the bending movement in the middle of the rotational movement, or to start the rotational movement and the bending movement simultaneously.

3. Third Embodiment

Next, a sensor unit drive device 2 according to a third embodiment of the present invention will be described, focusing on the differences from the first embodiment. The sensor unit drive device 2 according to the third embodiment is different in the hinge structure 32 of the sensor unit 3 and the configuration of the drive means 4.

Figure 16A:
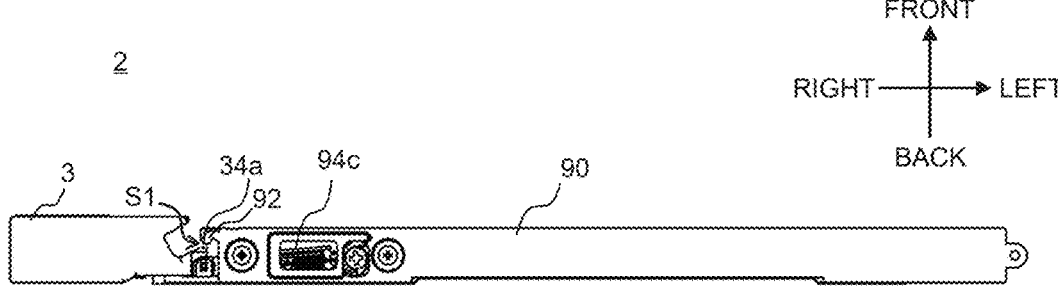
FIG. 16A is a plan view diagram of the sensor unit drive device 2.
Figure 16B:
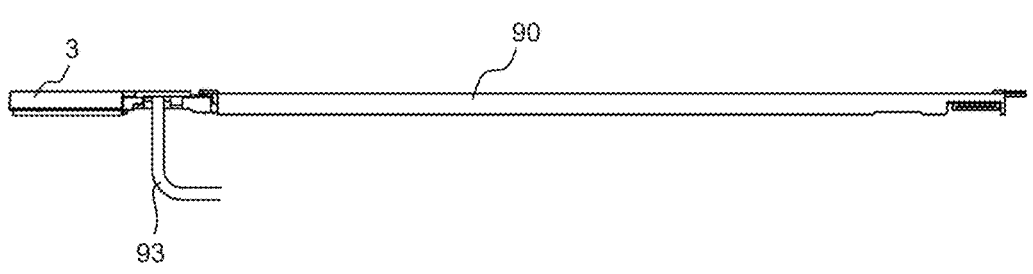
FIG. 16B is a side view diagram.
Figure 16C:
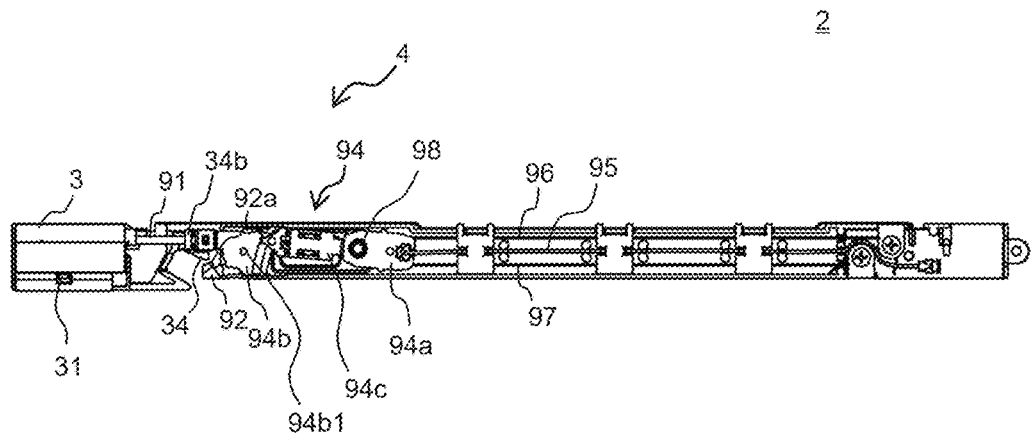
FIG. 16C is a view diagram seen from below.

FIGS. 16A to 16C are structural diagrams showing a state where the sensor unit drive device 2 according to the third embodiment is in the retracted position. FIG. 16A is a planar view of the sensor unit drive device 2, FIG. 16B is a side view, and FIG. 16C is a view seen from below. The sensor unit drive device 2 includes a main body frame 90 arranged along the side surface of the display panel 11, a sensor unit 3 where a sensor 31 is built-in, and a drive means 4 for driving the sensor unit 3. The sensor unit drive device 2 of this embodiment is arranged on the upper surface side of the display panel 11, and the main body frame 90 having a rectangular plate shape is arranged along the longitudinal direction (left-right direction) of the upper surface side. The sensor unit 3 and the main body frame 90 are connected by a shaft 91.

A guide member 92 is integrally provided at the end of the main body frame 90 on the sensor unit 3 side, and a sliding member 34 that slides along the guide member 92 is provided on the end of the sensor unit 3 on the main body frame 90 side. In this embodiment, the guide member 92 and the sliding member 34 constitute the hinge structure 32 that realizes the bending movement of the sensor unit 3. The main body frame 90 side of the sensor unit 3 is formed into a cutout shape to avoid contact with the guide member 92 during rotational movement. A first slope 92*a* is formed on the guide member 92, and a second slope 34*a* is formed on the sliding member 34, and the first slope 92*a* and the second slope 34*a* are configured to be slidable facing each other.

A plate spring 34*b* is attached to the surface opposite to the second slope 34*a* of the sliding member 34 so as to face the main body frame 90. The plate spring 34*b* is integrally formed by pressing a metal plate, and is fixed with fixing means such as screws. A flexible flat cable 93 for connecting to a control board (not shown) of the display device 1 extends from the sensor unit 3, but the plate spring 34*b* is configured to move together with the sensor unit 3 and not to come into contact with the flexible flat cable 93. It is noted that the plate spring 34*b* may be configured to be attached to the main body frame 90, and the sliding member 34 may be configured to be in contact with the guide member 92. Further, instead of the plate spring 34*b*, other springs such as a disc spring, torsion spring, or coil spring, or other elastic members such as rubber may be used.

In the retracted position, a predetermined gap S1 is provided between the first slope 92*a* of the guide member 92 and the second slope 34*a* of the sliding member 34. By adjusting the size of the gap S1, it is possible to change the timing where the bending movement of the sensor unit 3 starts after the rotational movement of the sensor unit 3 starts. In this embodiment, the size of the gap S1 is set so that the bending movement of the sensor unit 3 starts in the middle of the rotational movement. It is noted that the bending movement may start simultaneously with the start of the rotational movement, may start in the middle of the rotational movement, or may start after the end of the rotational movement. In order to prevent the sensor unit 3 from coming into contact with the bezel 13 during rotational movement, it is preferable to set the size of the gap S1 so that the bending movement starts during or after the rotational movement.

An arm 94 for operating a shaft 91 is attached to the main body frame 90. The arm 94 includes a first arm 94*a*, a second arm 94*b*, and a slider 94*c* connecting the first arm 94*a* and the second arm 94*b*. The first arm 94*a* is rotatably attached to the main body frame 90 by an integrally molded rotating shaft. The second arm 94*b* is attached to the main body frame 90 by a screw 94*b*1, and is configured to be rotatable about the screw 94*b*1 as a rotation axis. Further, one end of the second arm 94*b* is connected to the shaft 91.

A first shape memory alloy wire 96 and a second shape memory alloy wire 97, which are electrically connected to the electrode wire 95, are connected to the first arm 94*a* by a fixing screw 98. The first shape memory alloy wire 96 and the second shape memory alloy wire 97 perform rotational movement where the first arm 94*a* and the second arm 94*b* rotate due to the expansion and contraction of the energized first shape memory alloy wire 96 and second shape memory alloy wire 97 and the shaft 91 swivels and rotates around the screw 94*b*1 as the rotation axis. It is noted that the rotation drive means for the first arm 94*a* is not limited to the shape memory alloy wire, and other means such as a motor or a solenoid may be used.

Figure 17A:
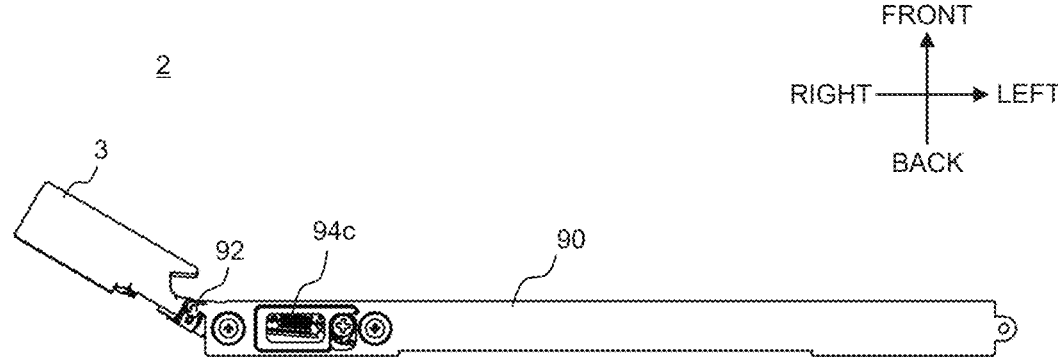
FIG. 17A is a plan view diagram of the sensor unit drive device 2.
Figure 17B:
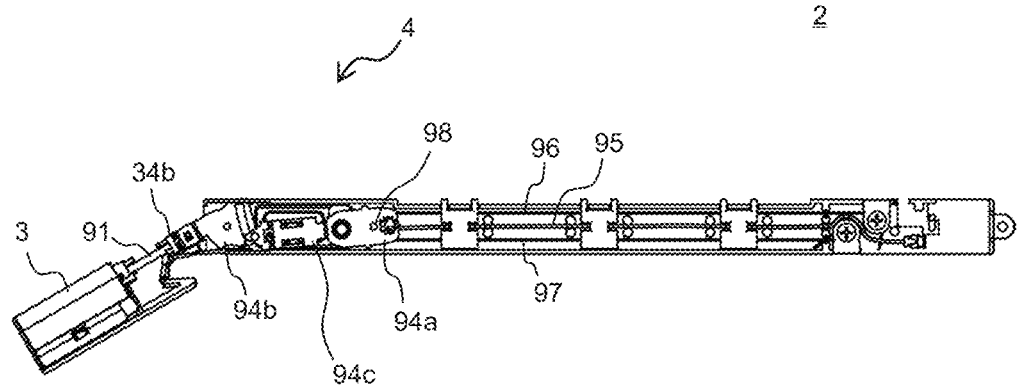
FIG. 17B is a view diagram seen from below.

Next, the movement of the sensor unit drive device 2 of this embodiment will be explained. In the retracted position shown in FIGS. 16A to 16C, a gap S1 exists between the first slope 92*a* of the guide member 92 and the second slope 34*a* of the sliding member 34. When the second shape memory alloy wire 97 is contracted by energization, the first arm 94*a* and the second arm 94*b* rotate in one direction, and the shaft 91 rotates, as shown in FIGS. 17A and 17B. As a result, the sensor unit 3 performs a rotational movement of swiveling and rotating along the upper surface of the display panel 11 around a rotation axis parallel to the display surface 11*a*, and protrudes from the bezel 13. During such rotational movement, the first slope 92*a* and the second slope 34*a* approach each other, and the gap S1 gradually becomes smaller.

When the second shape memory alloy wire 97 further contracts, the first slope 92*a* and the second slope 34*a* come into contact and start sliding. As a result, the sensor unit 3 starts a bending movement toward the display surface 11*a* while performing rotational movement. Specifically, the first slope 92*a* is pressed against the second slope 34*a*, thereby pressing the sensor unit 3 in a direction closer to the display surface 11*a*. It is noted that the second slope 34*a* is biased toward the first slope 92*a* by a biasing force of the plate spring 34*b* that does not inhibit the bending movement. This ensures that the first slope 92*a* and the second slope 34*a* come into contact with each other and can slide. At the time when the sensor unit 3 is bent 90 degrees toward the display surface 11*a* and placed at the detection position, energization to the second shape memory alloy wire 97 is stopped. This allows the sensor 31 to face the display surface 11*a* and measure the optical characteristics of the display panel 11.

When moving the sensor unit 3 from the detection position to the retreat position, the first shape memory alloy wire 96 is energized. When the first shape memory alloy wire 96 contracts, the first arm 94*a* rotates in the other direction, and by performing the above series of movements in the reverse order, the sensor unit 3 can be moved from the detection position to the retracted position and stored in the cabinet 12.

4. Fourth Embodiment

Next, a sensor unit drive device 2 according to a fourth embodiment of the present invention will be described, focusing on the differences from the first embodiment. The sensor unit drive device 2 according to the fourth embodiment differs in the configuration of the drive means 4.

Figure 18A:
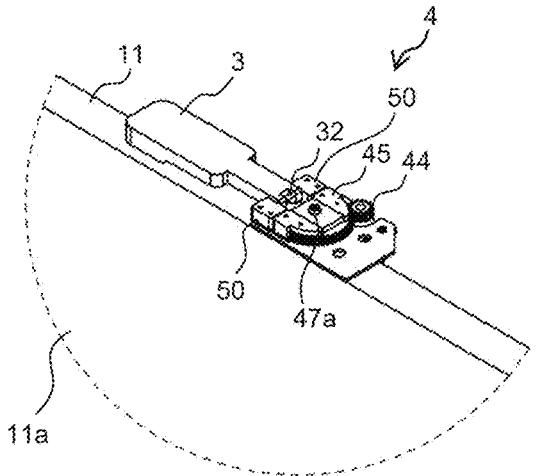
FIG. 18A shows a state where the sensor unit 3 is in the retracted position.

In the retracted position shown in FIG. 18A, the sensor unit 3 is disposed on the upper surface side of the display panel 11. A hinge structure 32 is provided on the base end side of the sensor unit 3, and the sensor unit 3 can be bent around the hinge structure 32. A bending movement pin 33 is provided on the base end side of the sensor unit 3, and both ends of the bending movement pin 33 protrude from a pair of opposing side surfaces of the sensor unit 3, respectively.

The drive means 4 connected to the sensor unit 3 is provided across the upper surface side and the back surface side. The drive means 4 includes a support member 50, an actuator 43, a pinion member 44, and a gear member 45. The support member 50 is a pair of substantially rectangular parallelepiped-shaped parts, is arranged to sandwich the sensor unit 3, and is fixed to the second base 47 at the bottom surface. Both ends of the bending movement pin 33 are inserted into the side surface of each support member 50 facing the sensor unit 3 so as to be rotatable with respect to the support member 50.

The gear member 45 is attached to the second base 47 using a screw 47*a*, and is rotatable about the screw 47*a* as a rotation axis. When the rotational movement of the actuator 43 is transmitted to the gear member 45 via the pinion member 44, the gear member 45 rotates. As a result, the second base 47 where the gear member 45 is fixed, the pair of support members fixed to the second base 47, and the sensor unit 3 where the bending movement pin 33 is inserted into the support member, rotate about the screw 47*a* as a rotation axis.

Next, the movement of the sensor unit drive device 2 of this embodiment will be explained. When the actuator 43 operates from the state shown in FIG. 18A, the gear member 45 rotates and the sensor unit 3 starts to swivel and rotate. The sensor unit 3 of this embodiment performs a rotational movement where the sensor unit 3 swivels and rotates counterclockwise in a planar view along the upper surface of the display panel 11 around a rotation axis parallel to the display surface 11*a*, specifically around the screw 47*a* as the rotation axis.

Figure 18B:
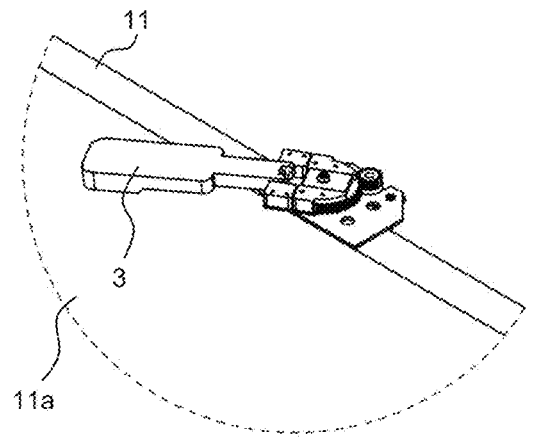
FIG. 18B shows a state where the sensor unit 3 is moving from the retracted position to the detection position.

Further, as shown in FIG. 18B, the sensor unit 3 performs a bending movement of bending toward the display surface 11*a* so as to rotate around the bending movement pin 33 as a rotation axis while performing a rotational movement. The sensor unit 3 of this embodiment is disposed so that its lower surface contacts the upper surface of the display panel 11 in the retracted position. Then, when the sensor unit 3 starts the rotational movement from the retracted position and protrudes from the bezel 13, the sensor unit 3 bends toward the display surface 11*a* via the hinge structure 32 so as to fall down under its own weight while the lower surface contacts a part of the front edge of the display panel 11.

Figure 18C:
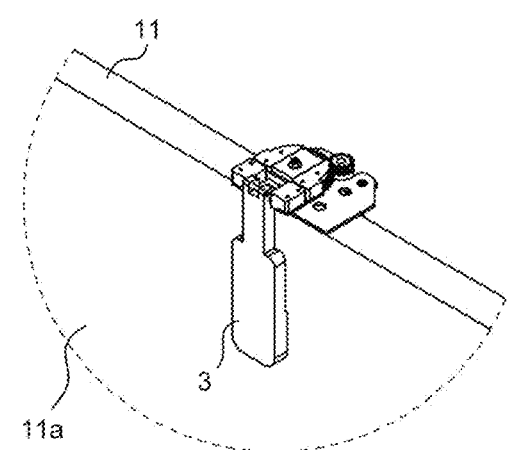
FIG. 18C shows a state where the sensor unit 3 is in the detection position.

FIG. 18C is a diagram showing a state where the sensor unit 3 further performs a rotational movement and a bending movement from the state shown in FIG. 18B and is disposed at a detection position. The sensor unit 3 is in a state where it was swiveled and rotated by 90 degrees from a state where it is disposed horizontally along the upper surface of the display panel 11 in the retracted position, and was a bent by 90 degrees. This allows the sensor 31 to face the display surface 11*a* and measure the optical characteristics of the display panel 11. Furthermore, when moving the sensor unit 3 from the detection position to the retracted position, the series of movements described above are performed in the reverse order. At this time, the lower surface of the sensor unit 3 comes into contact with a part of the front edge of the display panel 11 as the sensor unit 3 swivels and rotates, and is pressed against the front edge and lifted, so that the sensor unit 3 rotates in a direction away from the display surface 11*a* with the bending movement pin 33 as the rotation axis, and becomes in a horizontal state.

It is noted that a biasing member (not shown) may be attached to the hinge structure 32 so that a biasing force acts in a direction to bend the sensor unit 3 around the hinge structure 32 toward the display surface 11*a*. The biasing member is, for example, a torsion coil spring. Thereby, the sensor unit 3 can be pressed against the display surface 11*a* at the detection position and brought closer to the display surface 11*a*. Further, even when the sensor unit 3 is provided on a side surface side other than the upper surface of the display panel 11 in the retracted position, the sensor unit 3 can be bent toward the display surface 11*a*.

5. Fifth Embodiment

Next, a sensor unit drive device 2 according to a fifth embodiment of the present invention will be described, focusing on the differences from the first embodiment. The sensor unit drive device 2 according to the fifth embodiment differs from the first embodiment in that the sensor unit 3 is configured to be expandable and contractible in the longitudinal direction.

5.1. Basic Form

Figure 19A:
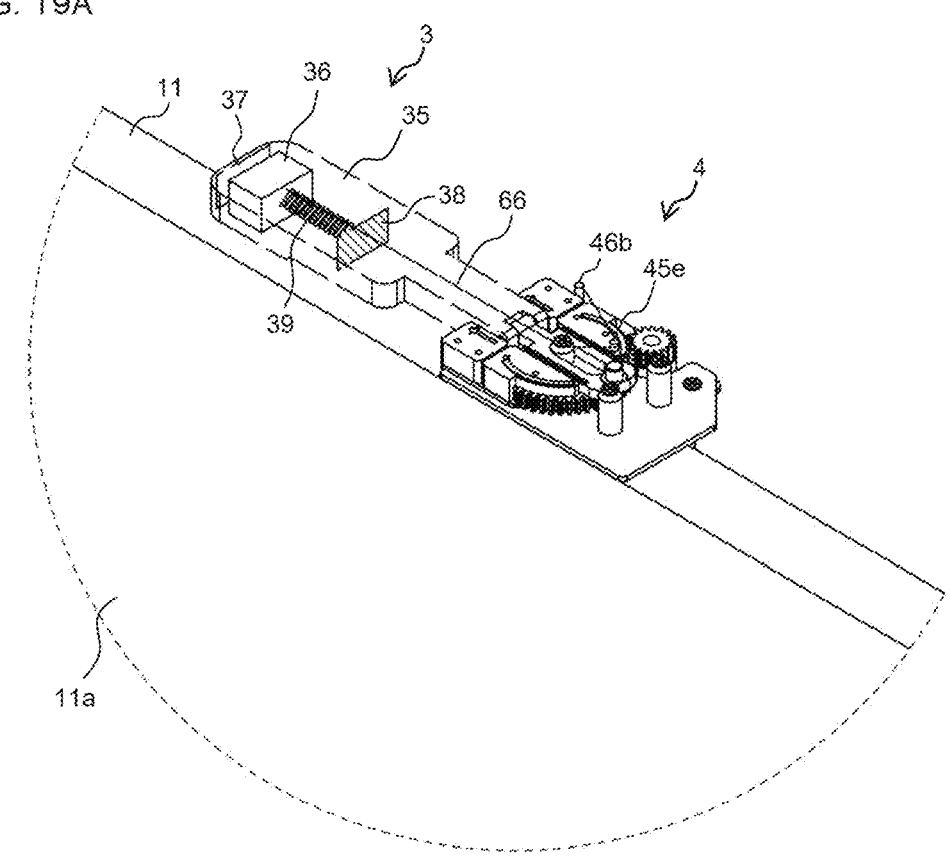
FIG. 19A shows a state where the sensor unit 3 is in the retracted position and a sensor head 36 is stored in a housing 35.
Figure 19B:
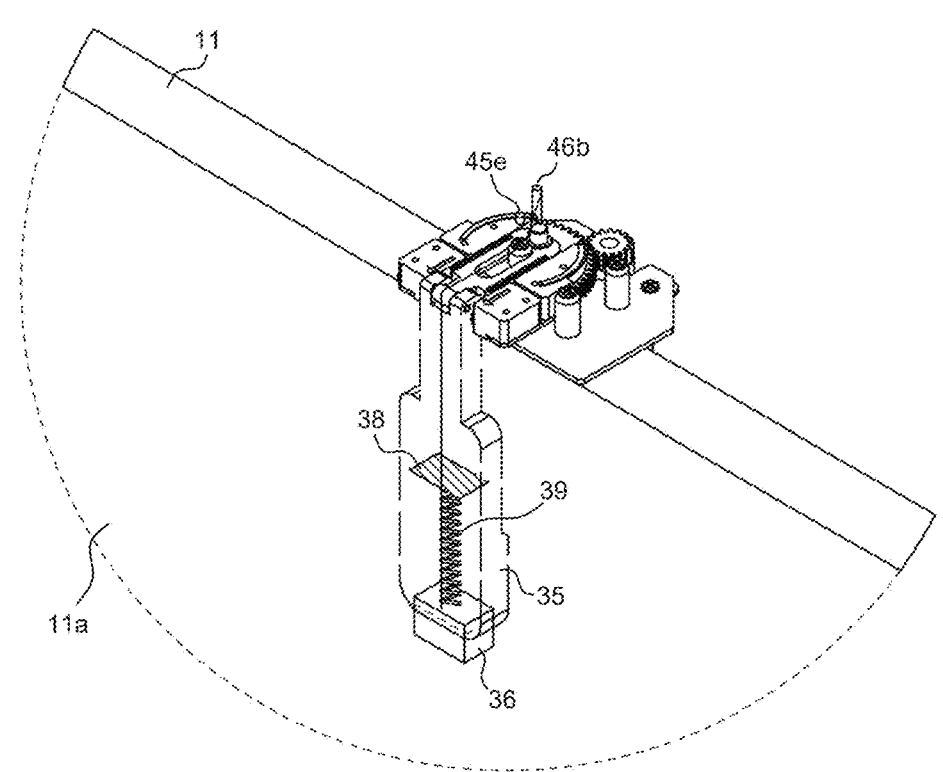
FIG. 19B shows a state where the sensor unit 3 is in the detection position and the sensor head 36 protrudes from the housing 35.

FIGS. 19A and 19B are perspective views showing the movement of the sensor unit drive device 2 according to the fifth embodiment. It is noted that in FIGS. 19A and 19B, the first cam 41 is omitted from the viewpoint of visibility. The sensor unit 3 of this embodiment includes a housing 35 shown by a broken line and a sensor head 36.

The sensor head 36 is a plate-shaped member, and the sensor 31 is provided on the lower surface in the retracted position shown in FIG. 19A. Further, the sensor head 36 is configured to be able to be inserted and taken out through the housing 35. In this embodiment, an opening 37 is formed in the end surface on the front end side of the sensor unit 3, and the sensor head 36 is inserted and taken out through the opening 37. The sensor head 36 and the inner wall 38 of the housing 35 are connected by a biasing member 39, and the biasing member 39 biases the sensor head 36 in a direction to push it out of the opening 37. The biasing member 39 is, for example, a compression spring. Further, a base pin 46*b* is provided on the first base 46, and one end of a wire 66 is connected to the base pin 46*b*. A wire guide 45*e* having a height that does not interfere with the first cam 41 disposed above the gear member 45 is provided on the upper surface of the gear member 45. The wire 66 is extended to the sensor head 36 via the wire guide 45*e*, and the other end of the wire 66 is connected to the sensor head 36.

In the retracted position shown in FIG. 19A, the wire 66 is extended from the base pin 46*b* to the sensor head 36 under tension. Due to the tension of the wire 66 that resists the biasing force of the biasing member 39, the sensor head 36 is drawn into the housing 35 and stored therein. When the drive means 4 drives the sensor unit 3, the sensor unit 3 moves to the detection position shown in FIG. 19B by a rotational movement and a bending movement similar to those in the first embodiment. Specifically, when the distance between the wire guide 45*e* and the base pin 46*b* decreases as the gear member 45 rotates, the tension of the wire decreases. Then, at least a part of the sensor head 36 protrudes from the opening 37 due to the biasing force of the biasing member 39. This allows the sensor 31 to face the display surface 11*a* and measure the optical characteristics of the display panel 11. It is noted that the protrusion length of the sensor head 36 from the housing 35 can be adjusted by appropriately setting the distance between the rotation center of the gear member 45 and the wire guide 45*e*. Further, by performing the above series of movements in the reverse order, the sensor unit 3 can be moved from the detection position to the retracted position while the sensor head 36 is stored in the housing 35.

In the configuration of the sensor unit drive device 2 of this embodiment, the sensor unit 3 can be expanded and contracted in the longitudinal direction. Therefore, at the detection position, the sensor head 36 can be made to protrude from the housing 35 and reach a position closer to the center of the monitor. Furthermore, in the retracted position, the sensor head 36 can be stored within the housing 35, making it possible to store it compactly.

It is noted that in this embodiment, one end of the wire 66 is connected to the base pin 46*b* fixed on the first base 46, but the manner where the wire is connected is not limited to this. For example, one end of the wire 66 may be connected to a wire bobbin (not shown) attached to the shaft of an actuator (not shown) such as a motor, and the wire 66 may be continuously pulled out or wound up from the wire bobbin. In such a configuration, the protrusion length of the sensor head 36 from the housing 35 can be freely adjusted by increasing or decreasing the tension by winding and pulling out the wire 66.

Further, the expandable structure of the sensor unit 3 in this embodiment is applicable to any configuration of the sensor unit drive device 2 where the base pin 46*b* and the wire guide 45*e* whose distance from the base pin 46*b* is variable can be installed. For example, the expandable structure can also be applied to the sensor unit drive device 2 of the second to fourth embodiments.

5.2. Modification

Figure 20A:
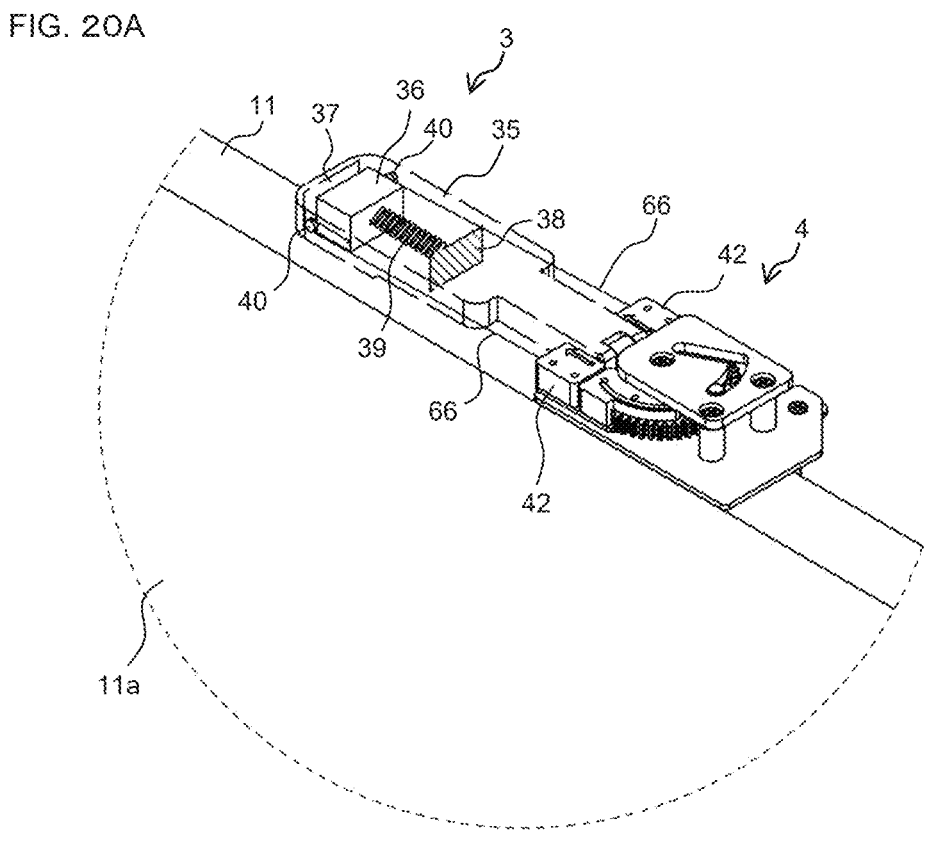
FIG. 20A shows a state where the sensor unit 3 is in the retracted position and the sensor head 36 is stored in the housing 35.
Figure 20B:
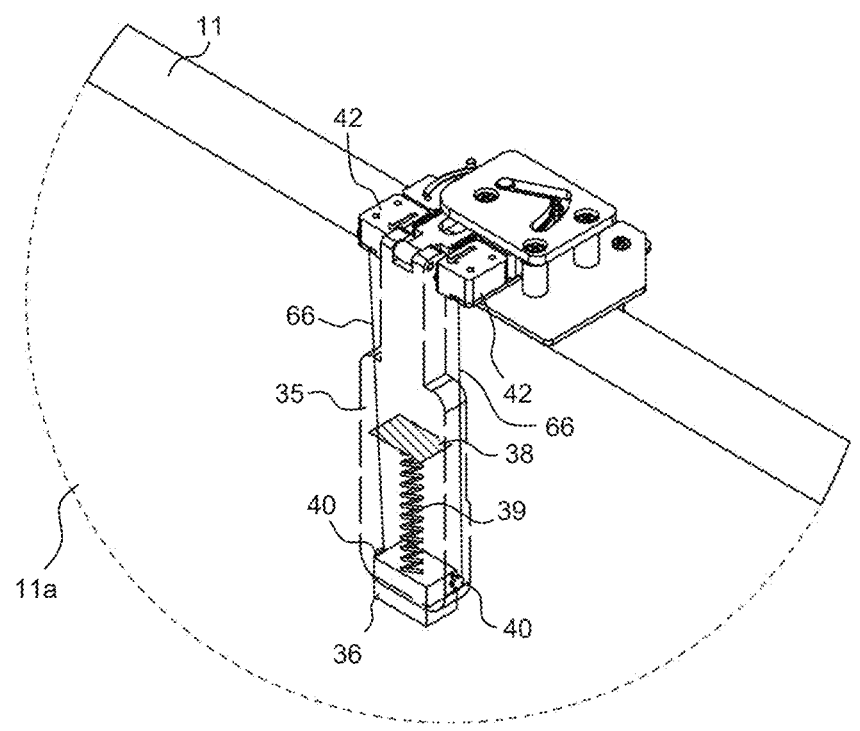
FIG. 20B shows a state where the sensor unit 3 is in the detection position and the sensor head 36 protrudes from the housing 35.

A modification of the fifth embodiment is shown in FIGS. 20A and 20B. In this modification, the sensor head 36 and the inner wall 38 of the housing 35 are connected by a biasing member 39, and the biasing member 39 biases the sensor head 36 in a direction to draw it into the housing 35. The biasing member 39 is, for example, a tension spring.

Further, two wires 66 are used, and one end of the wires 66 is connected to the side surfaces of the pair of second cams 42, respectively. A pair of pulleys 40 are provided on the inner wall of the sensor unit 3 so as to sandwich the sensor head 36 therebetween, and the wire 66 passes through the pulley 40, and the second end as the other end of the wire 66 is connected to the side surface on the drive means 4 side of the sensor head 36.

In the retracted position shown in FIG. 20A, the rotational movement pin 72 of the slide component 7 is located at the starting end 51*a* of the first groove 51, and the bending movement pin 33 of the sensor unit 3 is located at the starting end 57*a* of the first part 57 of the third groove 56. In this state, the sensor head 36 is drawn into the housing 35 by the biasing force of the biasing member 39 and is stored therein. When the drive means 4 drives the sensor unit 3, the sensor unit 3 moves to the detection position shown in FIG. 20B by the rotational movement and bending movement similar to the first embodiment. Specifically, when the slide component 7 moves toward the sensor unit 3 along the placement groove 45*c* of the gear member 45, the bending movement pin 33 moves along the first part 57 of the third groove 56, the sensor unit 3 moves in the direction where it is pushed out from the pair of second cams 42. When the distance between one end of the wire 66 connected to the second cam 42 and the pulley 40 increases by the movement of the sensor unit 3, the sensor head 36 connected to the other end of the wire 66 is pulled in a direction approaching the pulley 40. Due to the tension of the wire 66, the sensor head 36 protrudes from the opening 37 against the biasing force of the biasing member 39. After the bending movement pin 33 reaches the terminal end 57*b* of the first part 57 of the third groove 56, while moving along the second part 58, the distance between one end of the wire 66 connected to the second cam 42 and the pulley 40 is constant. Therefore, the sensor head 36 is maintained in a protruding state. This allows the sensor 31 to face the display surface 11*a* and measure the optical characteristics of the display panel 11.

6. Other Embodiment

Although various embodiments were described above, these are presented as examples, and the sensor unit drive device 2 according to the present invention is not limited to the configurations of these embodiments.

The installation position of the bezel 13 and the arrangement position of the sensor unit 3 in the retracted position are not limited to the upper surface side of the display panel 11. The configuration of the sensor unit drive device 2 of the first to fifth embodiments and their modifications is also applicable to cases where the installation position of the bezel 13 and the arrangement position of the sensor unit 3 in the retracted position are on the lower surface side, left surface side, or right surface side of the display panel 11.

In the drive means 4 of the first, second, fourth, and fifth embodiments, the rotational movement generated by the actuator 43 is transmitted using the pinion member 44 and the gear member 45, but the configuration of the drive means 4 is limited to this. For example, by using a wire that can be wound up and unrolled and a biasing member instead of the pinion member 44 and the gear member 45, it may be configured to transmit rotational movement by wire tension and to achieve bending movement by using the biasing force of the biasing member. Alternatively, a shape memory alloy wire may be used to generate rotational movement by utilizing the wire's expansion and contraction.

REFERENCE SIGNS LIST

1: display device, 2: sensor unit drive device, 3: sensor unit, 4: drive means, 7: slide component, 7a: first member, 7a1: projection part, 7b: second member, 7b1: long hole, 7c: connecting part, 8: connecting member, 11: display panel, 11a: display surface, 12: cabinet, 13: bezel, 14: opening, 30: light shielding member, 30a: lighting window, 31: sensor, 32: hinge structure, 33: bending movement pin, 34: sliding member, 34a: second slope, 34b: plate spring, 35: housing, 36: sensor head, 37: opening, 38: inner wall, 39: biasing member, 40: pulley, 41: first cam, 41a: first circular arc surface, 41b: first curved surface, 42: second cam, 42a: second circular arc surface, 42b: second curved surface, 43: actuator, 44: pinion member, 44a: cylindrical part, 44b: gear part, 45: gear member, 45a: gear part, 45b: projection part, 45c: placement groove, 45d: insertion hole, 45e: wire guide, 46: first base, 46a: boss, 46b: base pin, 47: second base, 47a: screw, 48: washer, 49: holder, 50: support member, 51: first groove, 51a: starting end, 51b: terminal end, 52: second groove, 52a: starting end, 52b: terminal end, 53: first screw hole, 53a: screw, 54: second screw hole, 55: third screw hole, 56: third groove, 57: first part, 57a: starting end, 57b: terminal end, 58: second part, 58a: starting end, 58b: terminal end, 61: first rack and pinion mechanism, 61a: first rack, 61b: first pinion, 62: second rack and pinion mechanism, 62a: second rack, 62b: second pinion, 63: first biasing member, 64: second biasing member, 65: wire, 66: wire, 71: connection part, 72: rotational movement pin, 73: slot-shaped through hole, 90: main body frame, 91: shaft, 92: guide member, 92a: first slope, 93: flexible flat cable, 94: arm, 94a: first arm, 94b: second arm, 94b1: screw, 94c: slider, 95: electrode wire, 96: first shape memory alloy wire, 97: second shape memory alloy wire, 98: fixing screw

The invention claimed is:

1. A sensor unit drive device, comprising:
a sensor unit having a sensor; and
a drive means connected to the sensor unit and driving the sensor unit, wherein
the sensor is configured to measure optical characteristics of a display panel that includes a display surface that displays an image,
the sensor unit is configured to be provided on a side surface side of the display panel in a retracted position, wherein the side surface connects a front surface and a rear surface of the display panel, and is configured such that the sensor faces the display surface in a detection position,
the sensor unit moves so that the retracted position and the detection position can be switched when the drive means drives the sensor unit, and
the sensor unit is configured to move to the detection position by a rotational movement of rotating around a rotational axis non-perpendicular to the display surface from the retracted position and a bending movement of bending toward the display surface via a hinge structure, when the drive means drives the sensor unit.

2. The sensor unit drive device of claim 1, wherein a bezel is provided on a periphery of the side surface of the display panel, and the sensor unit is configured to perform the bending movement after protruding from the bezel by the rotational movement.

3. The sensor unit drive device of claim 1, wherein the drive means is provided
on the side surface side of the display panel, or
across the side surface side and a back side of the display panel.

4. The sensor unit drive device of claim 1, wherein the sensor unit is configured to start the bending movement in a middle of the rotational movement.

5. The sensor unit drive device of claim 1, wherein the hinge structure is provided on a base end side of the sensor unit, and the sensor is provided on a tip side of the sensor unit.

6. The sensor unit drive device of claim 1, wherein the sensor unit drive device includes a slide component, the slide component is connected to the hinge structure and provided on a base end side of the sensor unit, and the sensor is provided on a tip side of the sensor unit.

7. The sensor unit drive device of claim 6, wherein the slide component includes a first member connected to the hinge structure and a second member connected to the first member, and the first member is configured to be rotatable relative to the second member.

8. The sensor unit drive device of claim 6, wherein the slide component includes a rotational movement pin at an end opposite to a side connected to the hinge structure.

9. The sensor unit drive device of claim 8, wherein the sensor unit drive device includes a bending movement pin, and the bending movement pin is provided on the base end side of the sensor unit so that both ends thereof respectively protrude from a pair of opposing side surfaces of the sensor unit.

10. The sensor unit drive device of claim 9, wherein the drive means includes a first cam, a second cam, and an actuator, the first cam includes a first groove and a second groove formed continuously with the first groove, the second cam includes a third groove, the rotational movement of the sensor unit is performed by the rotational movement pin moving along the first groove, and the bending movement of the sensor unit is performed by the bending movement pin moving along the third groove at the same time as the rotational movement pin moves along the second groove.

11. The sensor unit drive device of claim 1, wherein the hinge structure includes a first slope provided on the drive means side and a second slope provided on the sensor unit side, and the bending movement of the sensor unit is performed by the first slope and the second slope sliding against each other.

12. The sensor unit drive device of claim 1, wherein the sensor unit is configured to be expandable and contractible in a longitudinal direction.

13. A display device, comprising: the sensor unit drive device of claim 1; and
the display panel.

* * * * *